United States Patent
Kato et al.

(10) Patent No.: US 9,140,201 B2
(45) Date of Patent: Sep. 22, 2015

(54) VEHICLE ENGINE START CONTROL DEVICE

(75) Inventors: Shunya Kato, Toyota (JP); Tooru Matsubara, Toyota (JP); Kenta Kumazaki, Toyota (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 409 days.

(21) Appl. No.: 13/824,794

(22) PCT Filed: Sep. 24, 2010

(86) PCT No.: PCT/JP2010/066604
§ 371 (c)(1),
(2), (4) Date: Mar. 18, 2013

(87) PCT Pub. No.: WO2012/039066
PCT Pub. Date: Mar. 29, 2012

(65) Prior Publication Data
US 2013/0179055 A1 Jul. 11, 2013

(51) Int. Cl.
*F02D 41/04* (2006.01)
*B60K 6/547* (2007.10)
(Continued)

(52) U.S. Cl.
CPC .............. *F02D 41/062* (2013.01); *B60K 6/48* (2013.01); *B60K 6/547* (2013.01); *B60W 10/06* (2013.01);
(Continued)

(58) Field of Classification Search
CPC .......... B60K 6/48; B60K 6/547; B60K 6/485; B60W 10/06; B60W 10/10; B60W 10/30; F02D 13/0203; F02D 41/062; F02D 41/0002; F02D 41/042; F02D 41/065; F02D 4/0225; F02D 2041/001; F02D 2041/0095; F02N 11/0814; F02N 11/006; F02N 19/004; F02N 19/005; F02N 2019/008; F02N 2200/021; F02N 2200/10
USPC .................. 701/105, 112, 103, 113; 123/399, 123/179.4, 179.3, 198 D, 198 F, 481, 90.15, 123/90.16, 90.17, 179.16, 179.18; 903/905; 290/38 R, 40 R
See application file for complete search history.

(56) References Cited

U.S. PATENT DOCUMENTS

| | | | |
|---|---|---|---|
| 6,679,205 B2* | 1/2004 | Morikami | 123/90.15 |
| 7,438,042 B1* | 10/2008 | Kawada | 123/198 B |

(Continued)

FOREIGN PATENT DOCUMENTS

| | | |
|---|---|---|
| EP | 1 403 511 A1 | 3/2004 |
| EP | 1 403 512 A1 | 3/2004 |

(Continued)

*Primary Examiner* — Lindsay Low
*Assistant Examiner* — George Jin
(74) *Attorney, Agent, or Firm* — Oliff PLC

(57) ABSTRACT

A vehicle engine start control device controls a crank angle such that the crank angle falls within a predetermined crank angle stop range when an engine is automatically stopped, the vehicle engine start control device starting the automatically stopped engine if a predetermined engine start condition is satisfied, the vehicle including an automatic transmission making up a portion of a power transmission path between the engine and drive wheels, and the vehicle engine start control device providing engine rotation resistance control such that rotation resistance of the engine generated due to a change in air pressure in a combustion chamber of the engine is made larger during an automatic stop period of the engine that the engine is automatically stopped and during a change in gear ratio in a shift of the automatic transmission as compared to the time of engine start.

19 Claims, 13 Drawing Sheets

(51) Int. Cl.

| | |
|---|---|
| *F02D 41/06* | (2006.01) |
| *B60K 6/48* | (2007.10) |
| *B60W 10/06* | (2006.01) |
| *F02D 41/00* | (2006.01) |
| *F02N 11/08* | (2006.01) |
| *F02N 19/00* | (2010.01) |
| *B60W 20/00* | (2006.01) |
| *F02D 41/02* | (2006.01) |

(52) U.S. Cl.
CPC .......... *F02D 41/0002* (2013.01); *F02D 41/042* (2013.01); *F02N 11/0814* (2013.01); *F02N 19/004* (2013.01); *F02N 19/005* (2013.01); B60W 20/00 (2013.01); *B60W 2510/0685* (2013.01); *F02D 41/023* (2013.01); *F02D 2041/001* (2013.01); *F02D 2041/002* (2013.01); *F02N 2019/008* (2013.01); *Y02T 10/42* (2013.01); *Y02T 10/48* (2013.01); *Y02T 10/6221* (2013.01)

(56) References Cited

U.S. PATENT DOCUMENTS

| | | | |
|---|---|---|---|
| 8,265,860 B2* | 9/2012 | Ichinose et al. | 701/113 |
| 8,694,231 B2* | 4/2014 | Ma et al. | 701/113 |
| 2003/0106515 A1* | 6/2003 | Kondo | 123/179.4 |
| 2004/0038774 A1 | 2/2004 | Kuroda et al. | |
| 2004/0149247 A1* | 8/2004 | Kataoka et al. | 123/179.4 |
| 2006/0048734 A1* | 3/2006 | Kataoka et al. | 123/179.4 |
| 2006/0212212 A1* | 9/2006 | Akasaka | 701/112 |
| 2006/0241851 A1* | 10/2006 | Berger | 701/112 |
| 2007/0163531 A1* | 7/2007 | Lewis et al. | 123/179.4 |
| 2008/0154484 A1* | 6/2008 | Takeyama et al. | 701/113 |
| 2008/0305923 A1* | 12/2008 | Tabata et al. | 477/3 |
| 2009/0209382 A1* | 8/2009 | Tabata et al. | 475/5 |
| 2010/0012086 A1* | 1/2010 | Demura | 123/399 |
| 2010/0036591 A1* | 2/2010 | Nakai | 701/112 |
| 2010/0075798 A1* | 3/2010 | Suzuki et al. | 477/5 |
| 2010/0275871 A1* | 11/2010 | Magarida et al. | 123/179.16 |

FOREIGN PATENT DOCUMENTS

| | | |
|---|---|---|
| JP | A-2001-159339 | 6/2001 |
| JP | A-2004-084679 | 3/2004 |
| JP | A-2004-124754 | 4/2004 |
| JP | A-2004-142632 | 5/2004 |
| JP | A-2004-225561 | 8/2004 |
| JP | A-2004-239111 | 8/2004 |
| JP | A-2005-146908 | 6/2005 |
| JP | A-2005-299390 | 10/2005 |
| JP | A-2006-125342 | 5/2006 |
| JP | A-2006-161684 | 6/2006 |
| JP | A-2006-316689 | 11/2006 |
| JP | A-2008-144683 | 6/2008 |
| JP | A-2008-163792 | 7/2008 |

* cited by examiner

FIG.3
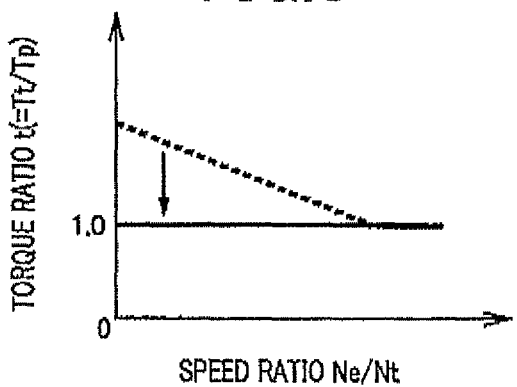
FIG.4
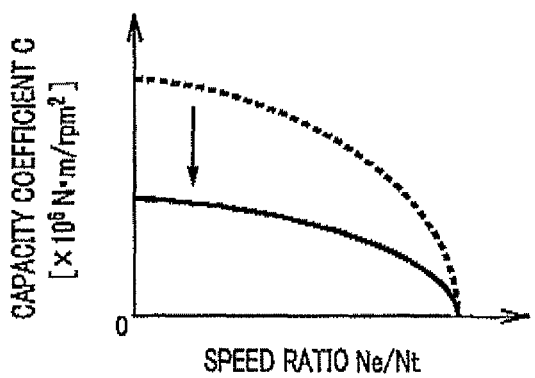
FIG.5
|     | C1 | C2 | C3 | C4 | B1 | B2 |
|-----|----|----|----|----|----|----|
| 1st | ○  |    |    |    |    | ○  |
| 2nd | ○  |    |    |    | ○  |    |
| 3rd | ○  |    | ○  |    |    |    |
| 4th | ○  |    |    | ○  |    |    |
| 5th | ○  | ○  |    |    |    |    |
| 6th |    | ○  |    | ○  |    |    |
| 7th |    | ○  | ○  |    |    |    |
| 8th |    | ○  |    |    | ○  |    |
| Rev1 |   |    | ○  |    |    | ○  |
| Rev2 |   |    |    | ○  |    | ○  |

|  | C1 | C2 | C3 | B1 | B2 | F01 | GEAR RATIO | STEP |
|---|---|---|---|---|---|---|---|---|
| 1st | O |  |  |  | (O) | O | 3.20 | |
| | | | | | | | | 1.86 |
| 2nd | O |  |  | O |  |  | 1.72 | |
| | | | | | | | | 1.72 |
| 3rd | O | O |  |  |  |  | 1.00 | |
| | | | | | | | | 1.49 |
| 4th |  | O |  | O |  |  | 0.67 | |
| Rev |  |  | O |  | O |  | 2.04 | GEAR RATIO WIDTH 4.76 |
| N |  |  |  |  |  |  | | |

VEHICLE ENGINE START CONTROL DEVICE

TECHNICAL FIELD

The present invention relates to a technique of controlling a vehicle engine that may automatically be stopped.

BACKGROUND ART

In a vehicle drive device including an engine as a drive force source for running, a vehicle engine start control device is well known that starts the automatically stopped engine if a predetermined engine start condition is satisfied. For example, this corresponds to an engine start control device described in Patent Document 1. The engine start control device of Patent Document 1 controls a crank angle of an engine (engine crank angle) to be within a predefined crank angle stop range when the engine is stopped such as when idling is stopped, for example. The predefined crank angle stop range is, for example, a range of crank angle suitable for an engine restart empirically determined in advance depending on engine parameters. For example, if an engine is restarted when the crank angle of the engine is within the crank angle stop range, favorable engine startability can be acquired by suppressing an engine starting shock. Although the engine start control device of Patent Document 1 controls the crank angle to be within the predefined crank angle stop range when the engine is stopped as described above, the crank angle may be displaced out of the predefined crank angle stop range for some reason before a restart after the stop of the engine. Therefore, when starting the engine, if the crank angle is within the predefined crank angle stop range, the engine start control device of Patent Document 1 starts the engine with a motor generator acting as a motor and an electric generator. On the other hand, if the crank angle is possibly out of the predefined crank angle stop range, the engine start control device of Patent Document 1 starts the engine with a DC starter acting as a motor.

PRIOR ART DOCUMENTS

Patent Documents

Patent Document 1: Japanese Laid-Open Patent Publication No. 2004-239111
Patent Document 2: Japanese Laid-Open Patent Publication No. 2006-316689
Patent Document 3: Japanese Laid-Open Patent Publication No. 2005-299390

SUMMARY OF THE INVENTION

Problems to Be Solved by the Invention

Although the engine start control device of Patent Document 1 attempts to rapidly and certainly start an engine by properly using two engine starting methods depending on a crank angle at the time of engine start, if one of the engine starting methods is selected regardless of driver's intention at the time of engine start, passengers including the driver may feel discomfort. On the other hand, when the crank angle is out of the crank angle stop range, if the motor generator raises an engine rotation speed to start the engine, the motor generator may be unable to rapidly raise the engine rotation speed due to insufficient output power etc., of the motor generator and the flexibility in engine start may be lowered then, the passengers may feel discomfort. Such a problem is not known.

The present invention was conceived in view of the situations and it is therefore an object of the present invention to provide a vehicle engine start control device capable of suppressing a feeling of discomfort brought to a driver and rapidly and certainly starting an engine when the automatically stopped engine is restarted.

Means for Solving the Problems

To achieve the object, the present invention provides (a) a vehicle engine start control device controlling a crank angle such that the crank angle falls within a predetermined crank angle stop range when an engine is automatically stopped, the vehicle engine start control device starting the automatically stopped engine if a predetermined engine start condition is satisfied, (b) the vehicle engine start control device providing engine rotation resistance control such that rotation resistance of the engine generated due to a change in air pressure in a combustion chamber of the engine is made larger during an automatic stop period of the engine as compared to the time of engine start.

The Effects of the Invention

Consequently, since the crankshaft of the engine is hardly rotated by an external force while the engine is in the automatic stop period, the crank angle can be retained during stop of the engine with no or little change. Since the crank angle at the time of automatic stop of the engine is controlled to fall within the crank angle stop range, if the crank angle stop range is set to a crank angle range suitable for engine restart, the engine can be stopped at the crank angle suitable for engine restart in such a manner that the engine starting shock can be reduced. Therefore, since the crankshaft is stopped within or in the vicinity of the crank angle stop range at the time of restart of the engine, when the automatically stopped engine is restarted, favorable engine startability is ensured and the engine can quickly and certainly be started while suppressing a feeling of discomfort brought to a driver.

Preferably, in the engine rotation resistance control, the rotation resistance of the engine generated due to an air compression in a combustion chamber of the engine, i.e., the rotation resistance of the engine generated due to a compression of the engine is made larger during an automatic stop period of the engine as compared to the time of engine start.

Preferably, (a) the engine includes at least one of an intake valve opening/closing timing changing device advancing or delaying both opening timing and closing timing of an intake valve and an exhaust valve opening/closing timing changing device advancing or delaying both opening timing and closing timing of an exhaust valve, and wherein (b) in the engine rotation resistance control, the rotation resistance of the engine is made larger by at least one of shifting the opening timing and the closing timing of the intake valve in advance direction as compared to the time of the engine start and shifting the opening timing and the closing timing of the exhaust valve in delay direction as compared to the time of the engine start. Consequently, because an actual vehicle engine often includes the intake valve opening/closing timing changing device and the exhaust valve opening/closing timing changing device, the engine including the intake valve opening/closing timing changing device and the exhaust valve opening/closing timing changing device as described above can easily provide the engine rotation resistance control by utilizing at least one of the intake valve opening/closing timing changing device and the exhaust valve opening/closing timing changing device without particularly adding a new device.

Preferably, (a) the engine includes at least one of an intake valve opening/closing timing changing device changing opening timing and closing timing of an intake valve independently of each other and an exhaust valve opening/closing timing changing device changing opening timing and closing timing of an exhaust valve independently of each other, and wherein (b) in the engine rotation resistance control, the rotation resistance of the engine is made larger by at least one of shifting the opening timing of one or both of the intake valve and the exhaust valve in delay direction as compared to the time of the engine start, shifting the closing timing of one or both of the intake valve and the exhaust valve in advance direction as compared to the time of the engine start, and maintaining the intake valve and the exhaust valve in a closed state regardless of the crank angle of the engine. Consequently, a larger level of the rotation resistance of the engine can easily be acquired in the engine rotation resistance control as compared to the case of advancing or delaying the opening timing and the closing timing of the intake valve or the exhaust valve together.

Preferably, in the engine rotation resistance control, the rotation resistance of the engine is made larger by changing the opening timing or the closing timing of one or both of the intake valve and the exhaust valve such that an air quantity compressed in the combustion chamber of the engine in accordance with the rotation of the engine is increased. Consequently, if the engine includes the intake valve opening/closing timing changing device and the exhaust valve opening/closing timing changing device, the engine rotation resistance control can be provided and the rotation resistance of the engine can quickly and easily be increased and decreased.

Preferably, in the engine rotation resistance control, the rotation resistance of the engine is made larger by further closing an electric throttle valve adjusting an intake air amount into the engine as compared to the time of the engine start. Consequently, because an actual vehicle engine often includes the electric throttle valve, even if, for example, the engine does not include the intake valve opening/closing timing changing device and the exhaust valve opening/closing timing changing device, the engine rotation resistance control can be provided. In the engine rotation resistance control, the rotation resistance of the engine may be made larger as compared to the time of engine start by placing the electric throttle valve in a fully closed state.

Preferably, in the engine rotation resistance control, the rotation resistance of the engine during the stop period of the engine is set based on at least one of a request from a driver and a vehicle state. During the engine stop, the rotation resistance of the engine is desirably smaller for acquiring favorable engine startability and is desirably larger for reducing a change amount of the engine crank angle. Therefore, as described above, the rotation resistance of the engine can be set depending on the request from a driver or the vehicle state so as to satisfy both the engine startability, such as reduction in engine starting shock, and the reduction in change amount of the engine crank angle, for example.

Preferably, (a) the vehicle includes an automatic transmission making up a portion of a power transmission path between the engine and drive wheels, and wherein (b) in the engine rotation resistance control, the rotation resistance of the engine is made larger during a change in gear ratio in a shift of the automatic transmission as compared to the time of engine start. Consequently, although the input shaft rotation speed of the automatic transmission significantly changes during a change in gear ratio in a shift of the automatic transmission and the crankshaft of the engine is dragged and easily rotated, the engine rotation resistance control can be provided during such a change in gear ratio to increase the engine rotation resistance, thereby suppressing a change in the engine crank angle. Although the shift of the automatic transmission may be an upshift or a downshift, the input shaft rotation speed of the automatic transmission rises during the shift in the case of a downshift and, therefore, it is believed that the engine rotation resistance control produces a particularly higher effect during a downshift.

Preferably, in the engine rotation resistance control, a control to vary the rotation resistance of the engine to increase as compared to the time of engine start is completed before a change in gear ratio is started in a shift of the automatic transmission. Consequently, since the rotation resistance of the engine is already increased before the change in gear ratio starts, i.e., before the input shaft rotation speed of the automatic transmission starts changing as the shift progresses, the crankshaft of the engine can sufficiently be restrained from being dragged and rotated by a change in the input shaft rotation speed associated with the progress of the shift.

Preferably, if it is determined that a crank angle of the engine enters a predetermined stable state after completion of a shift of the automatic transmission, the engine rotation resistance control is terminated. Even if the provision of the engine rotation resistance control increases the rotation resistance of the engine, a change amount of the engine crank angle is not zero and a change amount is supposed to be generated to some degree. When a change in the input shaft rotation speed is stopped when the shift is terminated, the crankshaft of the engine is slightly rotated in the opposite direction as compared to during the shift, attempting to return to the engine crank angle before the start of the shift. Therefore, as described above, since the engine rotation resistance control is provided when the crankshaft of the engine attempts to slightly rotate and return immediately after completion of the shift, the returning rotation of the crankshaft can be facilitated to further reduce a change amount of the engine crank angle when compared between before and after the shift.

Preferably, it is determined that the crank angle of the engine enters the stable state if the predefined post-shift extension time has elapsed from completion of a shift of the automatic transmission. Consequently, whether the crank angle enters the stable state can more easily be determined by measuring an elapsed time.

Preferably, if an engine start request for starting the engine is made while the rotation resistance of the engine is made larger in the engine rotation resistance control as compared to the time of the engine start, the rotation resistance of the engine is returned to a level at the time of the engine start before the engine is started. Consequently, since the engine is started after the rotation resistance of the engine is reduced, favorable engine startability can be ensured and, for example, an engine starting shock can be reduced.

Preferably, the vehicle includes a hydraulic power transmission device interposed between the engine and the automatic transmission. As a result, the power transmission between the engine and the automatic transmission can be interrupted by the hydraulic power transmission device.

Preferably, the vehicle includes a differential electric motor and a differential mechanism interposed between the engine and the automatic transmission and having a differential state controlled through the control of the differential electric motor. As a result, the power transmission between the engine and the automatic transmission can be interrupted through the control of the differential electric motor.

Preferably, (a) the vehicle includes an electric motor for running coupled to the drive wheels and (h) if the vehicle is caused to run with the engine stopped, the drive wheels are driven by the electric motor for running. This enables motor running in which the electric motor for running causes the vehicle to run with the engine stopped, and the engine and the electric motor for running can properly be used as a drive force source for running as needed, improving fuel efficiency.

BRIEF DESCRIPTION OF THE DRAWINGS

FIG. 3 is a diagram of relationship between a speed ratio and a reverse drive torque ratio in the reverse drive state of the torque converter depicted in FIG. 1.

FIG. 4 is a diagram of relationship between the speed ratio and the reverse drive capacity coefficient in the reverse drive state of the torque converter depicted in FIG. 1.

FIG. 5 is an operation table of the hydraulic friction engagement devices to establish shift stages in the automatic transmission depicted in FIG. 1.

MODES FOR CARRYING OUT THE INVENTION

One embodiment of the present invention will now be described in detail with reference to the drawings.

First Embodiment

Figure 1:
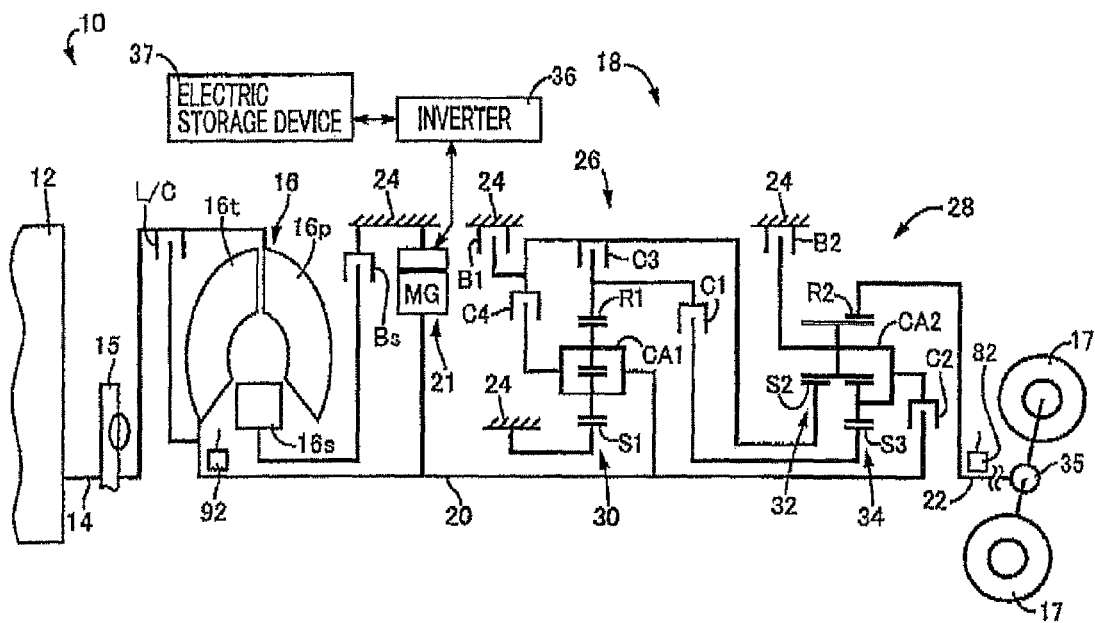
FIG. 1 is a schematic for explaining a configuration of a vehicle drive device of a first embodiment that is one embodiment of the present invention.

FIG. 1 is a schematic for explaining a configuration of a vehicle drive device 10 included in a vehicle 8 to which the present invention is applied. In FIG. 1, the vehicle drive device 10 is preferably employed in FR (front-engine rear-drive) type vehicles and includes an engine 12 that is an internal-combustion engine, a torque converter 16 that is a hydraulic power transmission device coupled to a crankshaft 14 of the engine 12, an automatic transmission 18 disposed between the torque converter 16 and drive wheels 17 and coupled to the torque converter 16, and an electric motor 21 for running disposed between the torque converter 16 and the automatic transmission 18 and coupled to an input shaft 20 (transmission input shaft 20) of the automatic transmission 18. In the vehicle drive device 10 configured as described above, the power of the engine 12 is transmitted from the crankshaft 14 of the engine 12 sequentially through the torque converter 16, the automatic transmission 18, a differential gear device 35, a pair of drive axles, etc., to a pair of the drive wheels 17. A flywheel damper 15 is interposed between the crankshaft 14 of the engine 12 and a pump impeller 16$p$ of the torque converter 16 and pulsation of torque is absorbed by the flywheel damper 15 between the engine 12 and the torque converter 16 while the torque is transmitted. The torque converter 16, the automatic transmission 18, the electric motor 21 for running, etc., are configured symmetrically relative to the common axial center thereof and lower halves from the axial center are not depicted in FIG. 1.

The torque converter 16 is a hydraulic power transmission device interposed between the engine 12 and the automatic transmission 18. The torque converter 16 includes the pump impeller 16p rotationally driven by the engine 12 to generate a fluid flow due to a flow of operating oil in the torque converter 16, a turbine impeller 16t coupled to the input shaft 20 of the automatic transmission 18 and rotated in response to the fluid flow from the pump impeller 16p, and a stator impeller 16s disposed in the fluid flow from the turbine impeller 16t to the pump impeller 16p and selectively coupled via a brake Bs to a transmission case 24 that is a non-rotating member. The input shaft 20 of the automatic transmission 18 also acts as an output member of the torque converter 16.

In the torque converter 16, when the pump impeller 16p is rotated by torque from the engine 12, the rotation of the pump impeller 16p is transmitted via the operating oil to the turbine impeller 16l and the turbine impeller 16t is rotated. This state, i.e., a state of rotationally driving the turbine impeller 16t by the pump impeller 16p is referred to as a forward drive state of the torque converter 16. As a result, the torque of the engine 12 is transmitted to the input shaft 20 of the automatic transmission 18. Contrary to this case, when the turbine impeller 16t is rotated by torque from the drive wheels 17, for example, during coasting (during inertia running with acceleration turned off), the rotation of the turbine impeller 16l is transmitted via the operating oil to the pump impeller 16p and the pump impeller 16p is rotated. This state, i.e., a state of rotationally driving the pump impeller 16p by the turbine impeller 16t is referred to as a reverse drive state of the torque converter 16. As a result, the torque from the drive wheels 17 is transmitted to the engine 12.

The brake Bs is a hydraulic friction engagement device similar to brakes B1, B2, etc., described later and is disposed between, and selectively couples, the stator impeller 16s and the transmission case 24. The complete engagement of the brake Bs fixes the stator impeller 16s to the transmission case 24 in non-rotatable manner. The release of the brake Bs puts the stator impeller 16s into a free rotation state relative to the transmission case 24. In the torque converter 16, a torque amplification effect is acquired by completely engaging the brake Bs to fix the stator impeller 16s in a converter range in the forward drive state, and reduction in efficiency is suppressed by releasing the brake Bs to put the stator impeller 16s into the free rotation state in a coupling range in the forward drive state. The brake Bs has a slip rate Rs [%] relative to the transmission case 24 continuously changed by controlling the engagement torque thereof. When the slip rate Rs is a smaller value, the rotation of the stator impeller 16s is more suppressed. When the slip rate Rs is zero, the stator impeller 16s is non-rotatably fixed to the transmission case 24.

Figure 2:
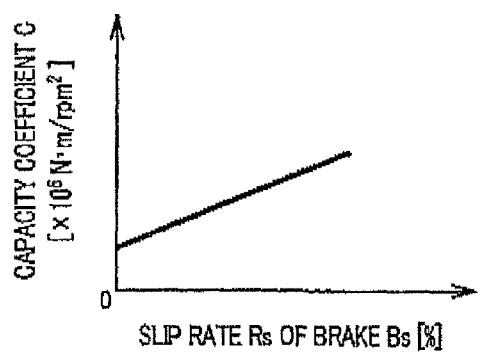
FIG. 2 is a diagram of relationship between the slip rate of the brake and a reverse drive capacity coefficient of the torque converter in the reverse drive state of the torque converter depicted in FIG. 1.

FIG. 2 is a diagram of relationship between the slip rate Rs of the brake Bs and a capacity coefficient (reverse drive capacity coefficient) $C[N \cdot m/rpm^2]$ of the torque converter 16 in the reverse drive state of the torque converter 16. As depicted in FIG. 2, when the slip rate Rs of the brake Bs is smaller, the reverse drive capacity coefficient C of the torque converter 16 becomes smaller as depicted in FIG. 2. This is because the suppression of the rotation of the stator impeller 16s blocks a flow of the operating oil in the torque converter 16.

FIG. 3 is a diagram of relationship between a speed ratio Ne/Nt and a torque ratio (reverse drive torque ratio) t in the reverse drive state of the torque converter 16. FIG. 4 is a diagram of relationship between the speed ratio Ne/Nt and the reverse drive capacity coefficient C in the reverse drive state of the torque converter 16. The speed ratio Ne/Nt is a ratio between an engine rotation speed (rotation speed of the crankshaft 14) Ne detected by an engine rotation speed sensor 80 (see FIG. 9) and a turbine rotation speed Nt (rotation speed of the turbine impeller 16t) detected by a turbine rotation speed sensor 92. The torque ratio t is a ratio between a torque Tt of the turbine impeller 16t and a torque Tp of the pump impeller 16p. In FIGS. 3 and 4, a broken line indicates a value when the brake Bs is released and a solid line indicates a value when the brake Bs is completely engaged. As depicted in FIGS. 3 and 4, as the slip rate Rs is made smaller through the control of the engagement torque of the brake Bs, the reverse drive torque ratio t comes closer to 1.0 and the reverse drive capacity coefficient C becomes lower. When the brake Bs is completely engaged, the reverse drive torque ratio t is 1 and the reverse drive capacity coefficient C is a minimum value corresponding to the speed ratio Ne/Nt.

As described above, while the reverse drive capacity coefficient C is lowered, the turbine impeller 16t and the pump impeller 16p are put into a state in which relative rotation is facilitated, i.e., in an easily slipping state, and a torque (reverse drive torque) from the drive wheels 17 of the vehicle 8 is hardly transmitted to the engine 12 as compared to the case of a relatively larger reverse drive capacity coefficient C. Therefore, for example, during coasting of the vehicle 8, even when the torque from the drive wheels 17 is added via the torque converter 16 to the engine 12, a drag torque Td acting on the crankshaft 14 via the torque converter 16 from the drive wheels 17 is reduced and a regenerative amount of the electric motor 21 for running can accordingly be increased. While the reverse drive capacity coefficient C is lowered, a shock generated in the engine 12, for example, a shock at the time of engine stop, is hardly transmitted to the drive wheels 17.

Returning to FIG. 1, the torque converter 16 includes a lockup clutch L/C disposed between the pump impeller 16p and the turbine impeller 16t. The lockup clutch L/C is controlled to be in one of a completely engaged state, a slipping state, and a released state. When the lockup clutch L/C is in the released state, the torque is transmitted between the crankshaft 14 and the input shaft 20 of the automatic transmission 18 via the operating oil in the torque converter 16 as described above. When the lockup clutch L/C is in the completely engaged state, the crankshaft 14 of the engine 12 and the input shaft 20 of the automatic transmission 18 are integrally coupled to each other and the torque is directly transmitted between the crankshaft 14 and the input shaft 20 without the intervention of the operating oil.

The electric motor 21 for running is a rotator configured to selectively acquire a function as an electric motor generating a drive torque and a function as an electric generator generating a regenerative torque and is made up of an AC synchronous motor generator, for example. The electric motor 21 for running can add a drive torque in both the positive and negative rotation directions to the input shaft 20 of the automatic transmission 18 through the drive thereof. The electric motor 21 for running can add a load torque, i.e., a braking torque in the negative rotation direction to the input shaft 20 through the electric generation (regeneration) thereof and can charge an electric storage device (battery) 37 that is an electric-motor power source coupled via an inverter 36 to the electric motor 21 for running such that electric power can be given and received. The positive rotation direction of the electric motor 21 for running is the rotation direction of the crankshaft 14 while the engine is driven and the negative rotation direction is the opposite direction.

In the vehicle drive device 10, a so-called fuel cut is performed to interrupt fuel supply to the engine 12 during coasting of the vehicle 8. As a result, the fuel consumption of the engine 12 is reduced and the fuel efficiency of the vehicle 8 is improved. In this embodiment, for example, the fuel efficiency of the vehicle 8 refers to a running distance per unit fuel consumption, and improvement in fuel efficiency refers to extension of the running distance per unit fuel consumption, or reduction in fuel consumption rate (=fuel consumption/drive wheel output) of the vehicle 8 as a whole. Contrary, deterioration in fuel efficiency refers to shortening of the running distance per unit fuel consumption or increase in fuel consumption rate of the vehicle 8 as a whole.

The automatic transmission 18 is a device making up a portion of the power transmission path between the engine 12 and the drive wheels 17 and changing speed of the outputs of the torque converter 16 and the electric motor 21 for running for output from an output shaft 22. The automatic transmission 18 includes a first transmission portion 26 and a second transmission portion 28 housed in the transmission case 24 acting as a non-rotating member. The first transmission portion 26 is mainly made up of a double pinion type first planetary gear device 30. The second transmission portion 28 is mainly made up of a single pinion type second planetary gear device 32 and a double pinion type third planetary gear device 34.

In the first transmission portion 26, a sun gear S1 of the first planetary gear device 30 is coupled and non-rotatably fixed to the transmission case 24. A carrier CA1 of the first planetary gear device 30 is coupled to the input shaft 20 of the automatic transmission 18 and coupled via a clutch C4 to a sun gear S2 of the second planetary gear device 32. A ring gear R1 of the first planetary gear device 30 is coupled via a clutch C1 to a sun gear S3 of the third planetary gear device 34 and coupled via a clutch C3 to the sun gear S2 of the second planetary gear device 32.

In the second transmission portion 28, a sun gear S2 of the second planetary gear device 32 is coupled via the brake B1 and non-rotatably fixed to the transmission case 24. A carrier CA2 of the second planetary gear device 32 and the third planetary gear device 34 is coupled via the brake B2 and non-rotatably fixed to the transmission case 24 and is coupled via a clutch C2 to the input shaft 20 of the automatic transmission 18. A ring gear R2 of the second planetary gear device 32 and the third planetary gear device 34 is coupled and non-rotatably fixed to the output shaft 22.

The clutches C1 to C4 and the brakes B1 and B2 are hydraulic friction engagement devices including a hydraulic cylinder and a wet type multi-plate clutch or brake frictionally engaged depending on an oil pressure supplied to the hydraulic cylinder.

In the automatic transmission 18, the hydraulic friction engagement devices (the clutches C1 to C4, the brakes B1 and B2) are respectively engaged or released in accordance with a predefined operation table depicted in FIG. 5 to establish shift stages of eight forward speeds and two reverse speeds having respective different gear ratios $\gamma_{18}$ (=transmission input shaft rotation speed $N_{ATIN}$/transmission output shaft rotation speed $N_{ATOUT}$). In FIG. 5, "○" indicates an engaged state and a blank indicates a released state. The transmission input shaft rotation speed $N_{ATIN}$ is the rotation speed of the transmission input shaft 20 and is the same as a turbine rotation speed Nt as can be seen from FIG. 1. The transmission output shaft rotation speed $N_{ATOUT}$ is the rotation speed of the output shaft 22 and may be referred to as an output shaft rotation speed $N_{OUT}$ of the vehicle drive device 10.

Figure 6:
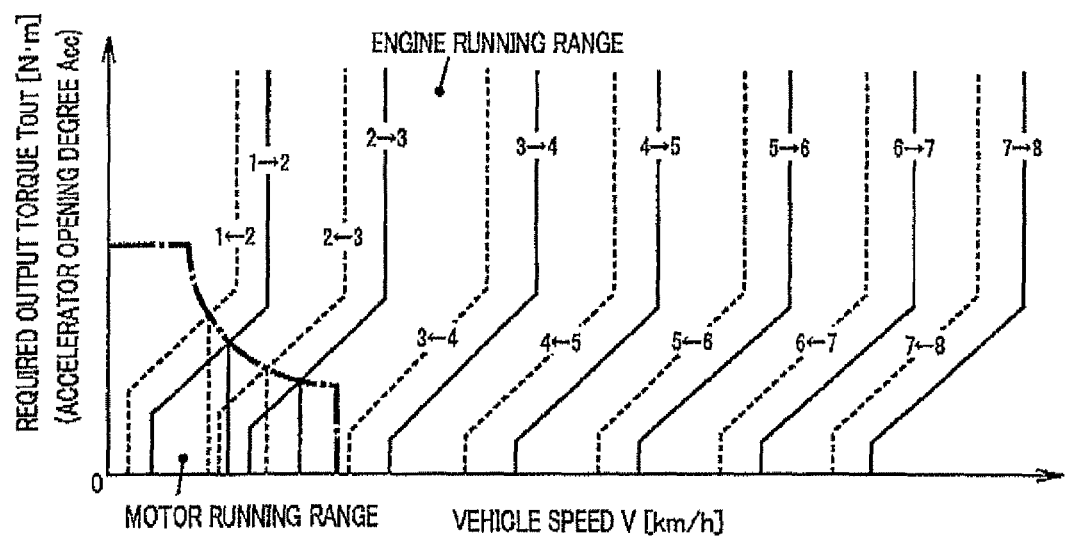
FIG. 6 is a diagram of one example of a preliminarily stored shift diagram that made up of in the same two-dimensional coordinates of a vehicle speed and a required output torque as a parameter and is basis for shift determination of the automatic transmission in the vehicle drive device of FIG. 1, and one example of a preliminary stored drive force source switching diagram having the boundary between an engine running range and a motor running range to switch between an engine running and a motor running, and also is a diagram of respective relationships.

The automatic shift control of the automatic transmission 18 is provided in accordance with a preliminarily stored shift diagram made up of a plurality of shift lines set within two-dimensional coordinates of a vehicle speed axis and a required output torque axis as depicted in FIG. 6. Specifically, a shift stage to be achieved in the automatic transmission 18 is determined based on a vehicle speed V [km/h] and a required output torque $T_{OUT}$ [N·m] from the shift diagram depicted in FIG. 6 and the hydraulic friction engagement devices (the clutches C1 to C4, the brakes B1 and B2) are actuated in accordance with the operation table depicted in FIG. 5 such that the determined gear stage is established. Since the required output torque $T_{OUT}$ making up the vertical axis of the shift diagram of FIG. 6 is represented by, for example, an amount of operation of an accelerator pedal 90 by a driver, i.e., an accelerator opening degree Acc, detected by an accelerator opening degree sensor 88 (see FIG. 9), the vertical axis of the shift diagram of FIG. 6 may be switched from the required output torque $T_{OUT}$ to the accelerator opening degree Acc.

The vehicle drive device 10 configured as described above switches and actuates the engine running causing the vehicle 8 to run with the power of the engine 12 and the motor running (also referred to as EV running) causing the vehicle 8 to run with the power of the electric motor 21 for running while the engine 12 is stopped, depending on a running state of the vehicle 8. The switching between the engine running and the motor running is performed based on which of an engine running range and a motor running range sectionalized by a dashed-dotted line in FIG. 6 a running state of the vehicle 8 (vehicle state) belongs to.

If the running state of the vehicle 8 belongs to the engine running range in FIG. 6, the running mode of the vehicle 8 is switched to the engine running. Therefore, the torque output from the engine 12 is input via the crankshaft 14 to the torque converter 16 and is amplified by the torque converter 16 and input to the input shaft 20 of the automatic transmission 18. The torque input to the input shaft 20 is changed in speed in the automatic transmission 18 and output from the output shaft 22. As a result, the torque from the engine 12 is transmitted to the drive wheels 17 of the vehicle 8. If the electric motor 21 for running is driven by using a portion of the output transmitted from the engine 12 to the input shaft 20 in the vehicle drive device 10, the electric motor 21 for running acts as an electric generator to charge the electric storage device 37. On the other hand, although the vehicle 8 is basically caused to run with the power of the engine 12 in the engine running, when a larger drive force is required, for example, when the accelerator pedal 90 is deeply depressed, the electric motor 21 for running is caused to act as an electric motor and outputs an assist torque as needed. Therefore, the engine running includes the case of using only the engine 12 as the drive force source for running and the case of using both the engine 12 and the electric motor 21 for running as the drive force sources for running.

If the running state of the vehicle 8 belongs to the motor running range in FIG. 6, the running mode of the vehicle 8 is switched to the motor running. Therefore, the engine 12 is stopped while the electric motor 21 for running is supplied with electric power from the electric storage device 37 and caused to act as an electric motor and a torque for vehicle running output from the electric motor 21 for running is input to the input shaft 20 of the automatic transmission 18. The torque input to the input shaft 20 is changed in speed in the automatic transmission 18 and output from the output shaft 22. As a result, the torque from the electric motor 21 for running is transmitted to the drive wheels 17 of the vehicle 8.

In the vehicle drive device 10, the torque from the drive wheels 17 is used for regeneration by the electric motor 21 for running during decelerated running of the vehicle 8 and the electric motor 21 for running acts as an electric generator to charge the electric storage device 37.

For example, even when the running state of the vehicle 8 belongs to the motor running range, if a charge state SOC (state of charge), i.e., charge remaining amount SOC of the electric storage device 37 is equal to or less than a predefined value, the vehicle drive device 10 performs the engine running. When the vehicle 8 is suddenly started or rapidly accelerated, the control is provided as needed such that output of both the engine 12 and the electric motor 21 for running is used for running the vehicle 8.

Figure 7:
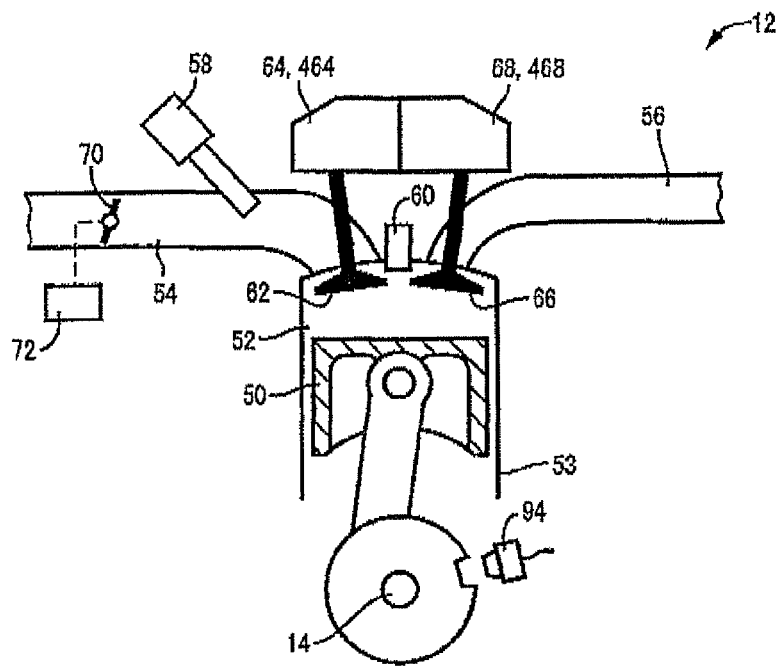
FIG. 7 is a general configuration diagram for explaining the configuration of the engine included in the vehicle drive device of FIG. 1.

FIG. 7 is a general configuration diagram for explaining the configuration of the engine 12. The engine 12 is a generally known port-injection gasoline engine for a vehicle and is, for example, an in-line four-cylinder engine in this embodiment although the engine 12 may be a single-cylinder engine or a multi-cylinder engine having two or more cylinders. The engine 12 is a four-stroke engine completing one cycle made up of an intake stroke, a compression stroke, an expansion stroke, and an exhaust stroke during two revolutions of the crankshaft 14. The engine 12 includes a combustion chamber 52 disposed between a cylinder head and a piston 50, an intake pipe 54 connected to an intake port of the combustion chamber 52, an exhaust pipe 56 connected to an exhaust port of the combustion chamber 52, a fuel injection device 58 disposed on the cylinder head and injecting and supplying fuel into intake air sucked into the combustion chamber 52, an ignition device 60 igniting air-fuel mixture in the combustion chamber 52 made up of the fuel injected and supplied by the fuel injection device 58 and the sucked air, an intake valve 62 opening and closing the intake port of the combustion chamber 52, an intake valve drive device 64 reciprocating the intake valve 62 in synchronization with the rotation of the crankshaft 14 for opening/closing actuation, an exhaust valve 66 opening or closing the exhaust port of the combustion chamber 52, an exhaust valve drive device 68 reciprocating the exhaust valve 66 in synchronization with the rotation of the crankshaft 14 for opening/closing actuation, and a crank angle sensor 94 detecting a crank angle (engine crank angle) $AG_{CR}$ of the engine 12. At the time of engine start, the engine rotation speed Ne is raised by the electric motor 21 for running, i.e., the engine 12 is cranked by the electric motor 21 for running for start-up. At the time of cranking of the engine 12 by the electric motor 21 for running, the lockup crutch L/C is put into the released state and the reverse drive capacity coefficient C of the torque converter 16 is controlled by the brake Bs to a level suitable for the engine start so that the output torque of the electric motor 21 for running is sufficiently transmitted to the crankshaft 14. Since the electric motor 21 for running is coupled via the torque converter 16 to the engine 12 in a power transmittable manner at the time of engine start, an engine starting shock is absorbed by the torque converter 16 and hardly transmitted to the drive wheels 17.

An electric throttle valve 70 is disposed on an upstream portion in the intake pipe 54 and the electric throttle valve 70 is actuated to open/close by an electric-powered throttle actuator 72. An opening degree $\theta_{TH}$ of the electric throttle valve 70 (hereinafter referred to as "throttle opening degree $\theta_{TH}$") is basically controlled to increase as an operation amount of the accelerator pedal 90, i.e., the accelerator opening degree Acc increases, and an intake air amount Q sucked into the engine 10 also increases in accordance with an increase in the throttle opening degree $\theta_{TH}$. The intake air amount Q (e.g., in "g/sec" or "g/rev") is weight of air sucked by the engine 10 per unit time or weight of air sucked by the engine 10 per rotation. The electric throttle valve 70 is an intake air amount adjusting valve capable of adjusting the intake air amount Q through the opening/closing actuation thereof and can substantially block an air flow to all the cylinders in the intake pipe 54 when the throttle opening degree $\theta_{TH}$ is set to zero, i.e., when a fully closed state is achieved.

In the engine 12, fuel is injected and supplied from the fuel injection device 58 into the intake air sucked from the intake pipe 54 into the combustion chamber 52 to form air-fuel mixture, and the air-fuel mixture is ignited by the ignition device 60 and combusted in the combustion chamber 52. As a result, the engine 12 is driven and the air-fuel mixture after the combustion is sent out as exhaust air to the exhaust pipe 56.

Although the intake valve drive device 64 basically performs the opening/closing actuation of the intake valve 62 in synchronization with the rotation of the crankshaft 14, the intake valve drive device 64 also has a function of changing the opening/closing timings, the lift amount, etc., of the intake valve 62 as needed and detects with a sensor and sequentially outputs the opening/closing timings, the lift amount, etc., of the intake valve 62 to be changed to an electronic control device 40. Therefore, the intake valve drive device 64 also acts as an intake valve opening/closing timing changing device changing the opening/closing timings of the intake valve 62. Although various operating principles of the intake valve drive device 64 are generally known, for example, the intake valve drive device 64 may be a cam mechanism operated in association with the rotation of the crankshaft 14, in which any of a plurality of cams having shapes different from each other is selectively used through hydraulic control or electric control for the opening/closing actuation of the intake valve 62, or may utilize the cam mechanism operated in association with the rotation of the crankshaft 14 along with a mechanism correcting the operation of cams in the cam mechanism through hydraulic control or electric control so as to perform the opening/closing actuation of the intake valve 62. In short, the intake valve drive device 64 is mainly made up of the cam mechanism, for example, and has a function as an intake valve opening/closing timing changing device advancing or delaying both the opening timing and the closing timing of the intake valve 62.

The exhaust valve drive device 68 is the same as the intake valve drive device 64 and, the exhaust valve drive device 68 basically performs the opening/closing actuation of the exhaust valve 66 in synchronization with the rotation of the crankshaft 14 and also has a function of changing the opening/closing timings, the lift amount, etc., of the exhaust valve 66 as needed and detects with a sensor and sequentially outputs the opening/closing timings, the lift amount, etc., of the exhaust valve 66 to be changed to the electronic control device 40. Therefore, the exhaust valve drive device 68 also acts as an exhaust valve opening/closing timing changing device changing the opening/closing timings of the exhaust valve 66. The operating principle of the exhaust valve drive device 68 is the same as the intake valve drive device 64. In short, the exhaust valve drive device 68 is mainly made up of the cam mechanism, for example, and has a function as an exhaust valve opening/closing timing changing device advancing or delaying both the opening timing and the closing timing of the exhaust valve 66.

When the engine is stopped, the rotation of the crankshaft 14 of the engine 12 is stopped within a predefined crank angle stop range (a starting optimum crank angle range) $AG_{ST}$ suitable for restart because of a reduced engine starting shock at the time of engine restart etc., by controlling the electric motor 21 for running and the brake Bs. Therefore, if the crank angle $AG_{CR}$ at the time of stop of the engine 12 is retained without change until restart of the engine 12, the engine 12 can smoothly be restarted with a reduced engine starting shock. The crank angle stop range $AG_{ST}$ is empirically determined in advance for each engine type and is determined in advance, for example, for the engine 12 of this embodiment, as a range from about 40 degrees to about 60 degrees before the crank angle $AG_{CR}$ corresponding to the top dead center of the piston 50 of any one of a plurality of cylinders included in the engine 12.

Figure 8:
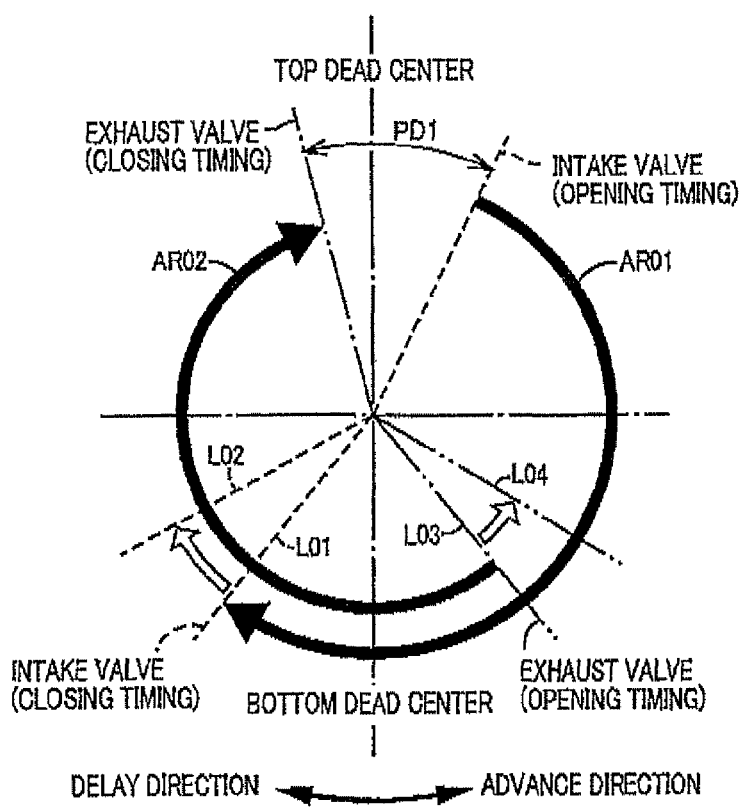
FIG. 8 is a diagram for explaining relationship between rotation resistance of the engine (engine rotation resistance) generated due to a change in air pressure within the combustion chamber of the engine and the opening/closing timings of the intake valve and the exhaust valve during stop of the engine provided in the vehicle drive device of FIG. 1.

FIG. 8 is a diagram for explaining relationship between rotation resistance of the engine 12 (engine rotation resistance) generated due to a change in air pressure within the combustion chamber 52 of the engine 12 and the opening/closing timings of the intake valve 62 and the exhaust valve 66 during engine stop. In FIG. 8, an arrow AR01 indicates a range of the crank angle $AG_{CR}$ while the intake valve 62 is opened, i.e., the open period of the intake valve 62 and an arrow AR02 indicates a range of the crank angle $AG_{CR}$ while the exhaust valve 66 is opened, i.e., the open period of the exhaust valve 66.

In FIG. 8, during the stroke of the piston 50 from the bottom dead center to the top dead center, air in the combustion chamber 52 of the engine 12 is compressed after the intake valve 62 is closed until the piston 50 arrives at the top dead center and the air compression generates the engine rotation resistance. Therefore, if the closing timing of closing the intake valve 62 is shifted, for example, from a broken line L01 in the delay direction to the crank angle $AG_{CR}$ indicated by a broken line L02, since this reduces an intra-cylinder compression volume that is a volume of an engine cylinder 53 corresponding to a stroke of the piston 50 from the closing timing of the intake valve 62 to the top dead center, an air pressured is made lower in the combustion chamber 52 at the top dead center, for example, and the engine rotation resistance is reduced. Therefore, as the closing timing of the intake valve 62 is shifted in the delay direction, the engine rotation resistance is made smaller. The intra-cylinder compression volume is calculated as the product of an area (e.g., in mm²) of the piston 50 projected in the stroke direction of the piston 50 and a movement distance (e.g., in mm) of the piston 50 from the closing timing of the intake valve 62 to the top dead center.

During the stroke of the piston 50 from the top dead center to the bottom dead center, air in the combustion chamber 52 of the engine 12 is expanded from when the piston 50 is at the top dead center until the exhaust valve 66 is opened and becomes equal to the atmospheric pressure when the exhaust valve 66 is opened. Therefore, the engine rotation resistance is generated by a negative pressure due to the air expansion until the exhaust valve 66 is opened. Therefore, if the opening timing of opening the exhaust valve 66 is shifted, for example, from a dashed-two dotted line L03 in the advance direction to the crank angle $AG_{CR}$ indicated by a dashed-two dotted line L04, since this reduces an intra-cylinder expansion volume that is a volume of the engine cylinder 53 corresponding to a stroke of the piston 50 from the top dead center to the opening timing of the exhaust valve 66, an air pressured is made higher in the combustion chamber 52 immediately before the opening of the exhaust valve 66, for example, and the engine rotation resistance is reduced. Therefore, as the opening timing of the exhaust valve 66 is shifted in the advance direction, the engine rotation resistance is made smaller. The intra-cylinder expansion volume is calculated as the product of an area (e.g., in mm²) of the piston 50 projected in the stroke direction of the piston 50 and a movement distance (e.g., in mm) of the piston 50 from the top dead center to the opening timing of the exhaust valve 66.

Figure 9:
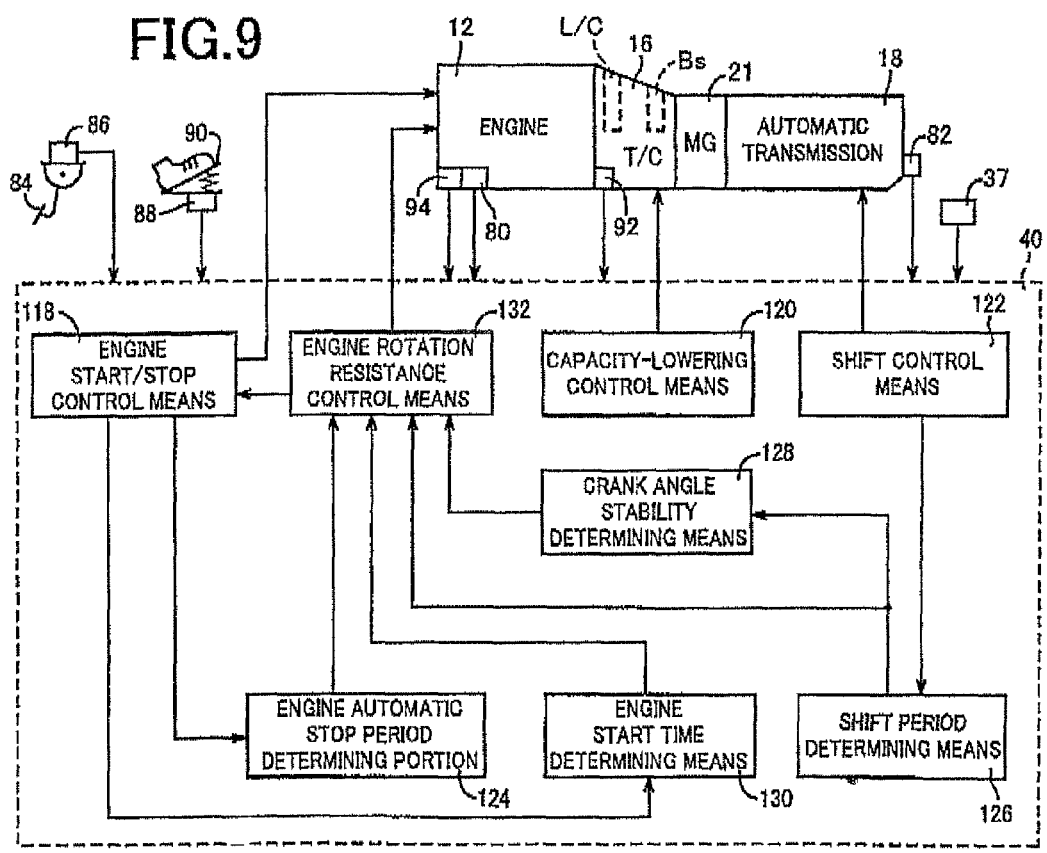
FIG. 9 is a functional block diagram for explaining a main portion of control function included in the electronic control device controlling the vehicle drive device of FIG. 1.

FIG. 9 is a functional block diagram for explaining a main portion of control function included in the electronic control device 40. The electronic control device 40 corresponds to an engine start control device of the present invention, is a device having a function of a control device of the vehicle drive device 10, and includes a so-called microcomputer equipped with a CPU, a RAM, a ROM, and an input/output interface, and the CPU executes signal processes in accordance with programs stored in advance in the ROM, while utilizing a temporary storage function of the RAM, to provide the output control of the engine 12, the shift control of the automatic transmission 18, and the output control of the electric motor 21 for running. As depicted in FIG. 9, the electronic control device 40 includes an engine start/stop control means 118 as an engine start/stop control portion, a capacity-lowering control means 120 as a capacity-lowering control portion, a shift control means 122 as a shift control portion, an engine automatic stop period determining means 124 as an engine automatic stop period determining portion, a shift period determining means 126 as a shift period determining portion, a crank angle stability determining means 128 as a crank angle stability determining portion, an engine start time determining means 130 as an engine start time determining portion, and an engine rotation resistance control means 132 as an engine rotation resistance control portion.

The engine start/stop control means 118 automatically stops the engine 12 without driver's operation if a predetermined engine stop condition is satisfied. If the predetermined engine start condition is satisfied, an engine start request for starting the engine 12 is made and the engine start/stop control means 118 automatically starts the engine 12 without driver's operation. Specifically, when the engine 12 is automatically stopped, the engine start/stop control means 118 controls the electric motor 21 for running and the brake Bs to provide stop-time crank angle control in which the engine 12 is stopped with the engine crank angle $AG_{CR}$ controlled such that the engine crank angle $AG_{CR}$ at the time of automatic stop of the engine 12 falls within the crank angle stop range $AG_{ST}$. At the time of engine start, the engine start/stop control means 118 controls the reverse drive capacity coefficient C of the torque converter 16 with the brake Bs to a level suitable for the engine start and raises the engine rotation speed Ne with the electric motor 21 for running to start the engine 12. Taking hybrid running of the vehicle 8 as an example, the satisfaction of the engine stop condition refers to the case that the vehicle state changes from the engine running range to the motor running range in FIG. 6, and the satisfaction of the engine start condition refers to the case that the vehicle state changes from the motor running range to the engine running range in FIG. 6. Taking the idling reduction control provided at the time of temporary stop during vehicle running as an example, the satisfaction of the engine stop condition refers to the case that an idling reduction execution condition is satisfied such as turning on of an ignition, a vehicle speed V of zero detected by a vehicle speed sensor 82 (see FIG. 1), a brake pedal 84 being depressed (operated), and the accelerator opening degree Acc of zero, for example, and the satisfaction of the engine start condition refers to the case that the idling reduction execution condition is not satisfied such as release of the depressed brake pedal 84, for example. Since the brake pedal 84 is an operation device for actuating a foot brake device (wheel brake device) well-known as a brake device adding a brake torque (brake force) to the drive wheels 17, the brake force is added to the drive wheels 17 when the brake pedal 84 is depressed, and whether the brake pedal 84 is depressed is detected by a foot brake switch 86.

While the engine 12 is stopped during vehicle running or during temporary stop, for example, while idling is stopped during the EV running and during vehicle stop, the capacity-lowering control means 120 completely engages the brake Bs to non-rotatably fix the stator impeller 16s, thereby reducing the reverse drive capacity coefficient C of the torque converter 16 lower than a value when the stator impeller 16s is in the free rotation state relative to the transmission case 24 acting as a non-rotating member.

The shift control means 122 makes a shift determination indicating that the automatic transmission 18 should be shifted, from relationship (shift diagram) having upshift lines (solid lines) and downshift lines (broken lines) set in advance as depicted in FIG. 6 based on a vehicle state such as an actual vehicle speed V and an required output torque $T_{OUT}$ of the automatic transmission 18 corresponding to the accelerator opening degree Acc etc., i.e., determines a shift stage of the automatic transmission 18 to be shifted and provides automatic shift control of the automatic transmission 18 such that the determined shift stage is achieved. For example, when the vehicle state traverses the upshift line from a range on the lower vehicle speed side to a range on the higher vehicle speed side in FIG. 6, the shift control means 122 makes a shift determination indicating that the automatic transmission 18 should be upshifted, and executes an upshift of the automatic transmission 18 corresponding to the traversed upshift line. On the other hand, when the vehicle state traverses the downshift line from a range on the higher vehicle speed side to a range on the lower vehicle speed side in FIG. 6, the shift control means 122 executes a downshift of the automatic transmission 18 corresponding to the traversed downshift line. The shift determination may be referred to as a shift request since a request for a shift is made to the automatic transmission 18 when the shift determination is made.

The engine automatic stop period determining means 124 determines whether the engine 12 is automatically stopped and is in an automatic stop period. In other words, it is determined whether a stop state is continuing after the satisfaction of the engine stop condition causes the engine start/stop control means 118 to automatically stop the engine 12. For example, an engine stop period during the motor running (EV running) or under the idling reduction control is the automatic stop period of the engine 12. On the other hand, if a driver operates an ignition key to stop the engine 12, the engine 12 is not in the automatic stop period.

The shift period determining means 126 determines whether the automatic transmission 18 is in a shift period. Specifically, the shift period of the automatic transmission 18 is a period from when the shift determination of the automatic transmission 18 is made until the end of a rotation speed change of the transmission input shaft 20 associated with the progress of a shift of the automatic transmission 18, i.e., until an inertia phase is terminated. Therefore, in particular, the shift period determining means 126 determines whether a shift of the automatic transmission 18 is started, i.e., whether the shift determination of the automatic transmission 18 is made. The shift period determining means 126 then determines whether the shift of the automatic transmission 18 is completed, i.e., whether the inertia phase is terminated. The shift period determining means 126 determines whether the automatic transmission 18 is in a shift period because during a shift of the automatic transmission 18, the turbine rotation speed Nt significantly changes in the inertia phase and the crank angle $AG_{CR}$ of the engine 12 is dragged and easily changed by the change in the turbine rotation speed Nt as compared to a non-shift period. Although the reverse drive capacity coefficient C of the torque converter 16 is reduced by the capacity-lowering control means 120 during engine stop, the reverse drive capacity coefficient C is not completely zero and, therefore, the crank angle $AG_{CR}$ may be dragged and changed by the rotation of the turbine impeller 16t.

The crank angle stability determining means 128 determines whether the crank angle $AG_{CR}$ of the engine 12 in the automatic stop period enters a predetermined stable state (crank angle stable state) after completion of a shift of the automatic transmission 18. The crank angle stable state is a state in which the engine crank angle $AG_{CR}$ no longer changes or no longer substantially changes and, for example, if a change amount of the engine crank angle $AG_{CR}$ within a predefined elapsed time sequentially detected by the crank angle sensor 94 becomes zero or equal to or less than a predefined change amount that can be considered as substantially zero, it is determined that the crank angle $AG_{CR}$ enters the crank angle stable state. Although the crank angle stability determining means 128 may determine whether the crank angle $AG_{CR}$ enters the crank angle stable state based on a change amount of the crank angle $AG_{CR}$, the determination is made based on an elapsed time in this embodiment for more simplified determination. Specifically, the crank angle stability determining means 128 determines whether a predefined post-shift extension time TIME01 has elapsed from completion of a shift of the automatic transmission 18. If the post-shift extension time TIME01 has elapsed from completion of the shift, it is determined that the crank angle $AG_{CR}$ of the engine 12 is stabilized, i.e., the crank angle $AG_{CR}$ enters the crank angle stable state. The post-shift extension time TIME01 is empirically obtained and set in advance such that the crank angle $AG_{CR}$ dragged and changed by the transmission input shaft 20 having a rotation speed changed in the inertia phase of the shift of the automatic transmission 18 enters the crank angle stable state before the post-shift extension time TIME01 has elapsed from completion of the shift.

The engine start time determining means 130 determines whether an engine start request for starting the stopped engine 12 is made. The engine start request is made, for example, when the engine start condition is satisfied. The engine start request may be made based on driver's operation. When the engine start request is made, the engine 12 is subsequently started.

The engine rotation resistance control means 132 provides engine rotation resistance control in which rotation resistance of the engine 12 (hereinafter referred to as "engine rotation resistance") generated due to a change in air pressure in the combustion chamber 52 of the engine 12 is made larger while the engine 12 is in the automatic stop period and the automatic transmission 18 is in the shift period, as compared to the time of engine start. Although the engine rotation resistance control means 132 may increase the engine rotation resistance in both the positive rotation direction and the negative rotation direction of the crankshaft 14 in the engine rotation resistance control, if the shift of the automatic transmission 18 is a downshift, the engine rotation resistance is at least increased in the positive rotation direction of the crankshaft 14 and, if the shift of the automatic transmission 18 is an upshift, the engine rotation resistance is at least increased in the negative rotation direction of the crankshaft 14. Whether the engine 12 is in the automatic stop period is based on the determination of the engine automatic stop period determining means 124 and whether the automatic transmission 18 is in the shift period is based on the determination of the shift period determining means 126. A time chart for specifically explaining this engine rotation resistance control is depicted in FIG. 10.

Figure 10:
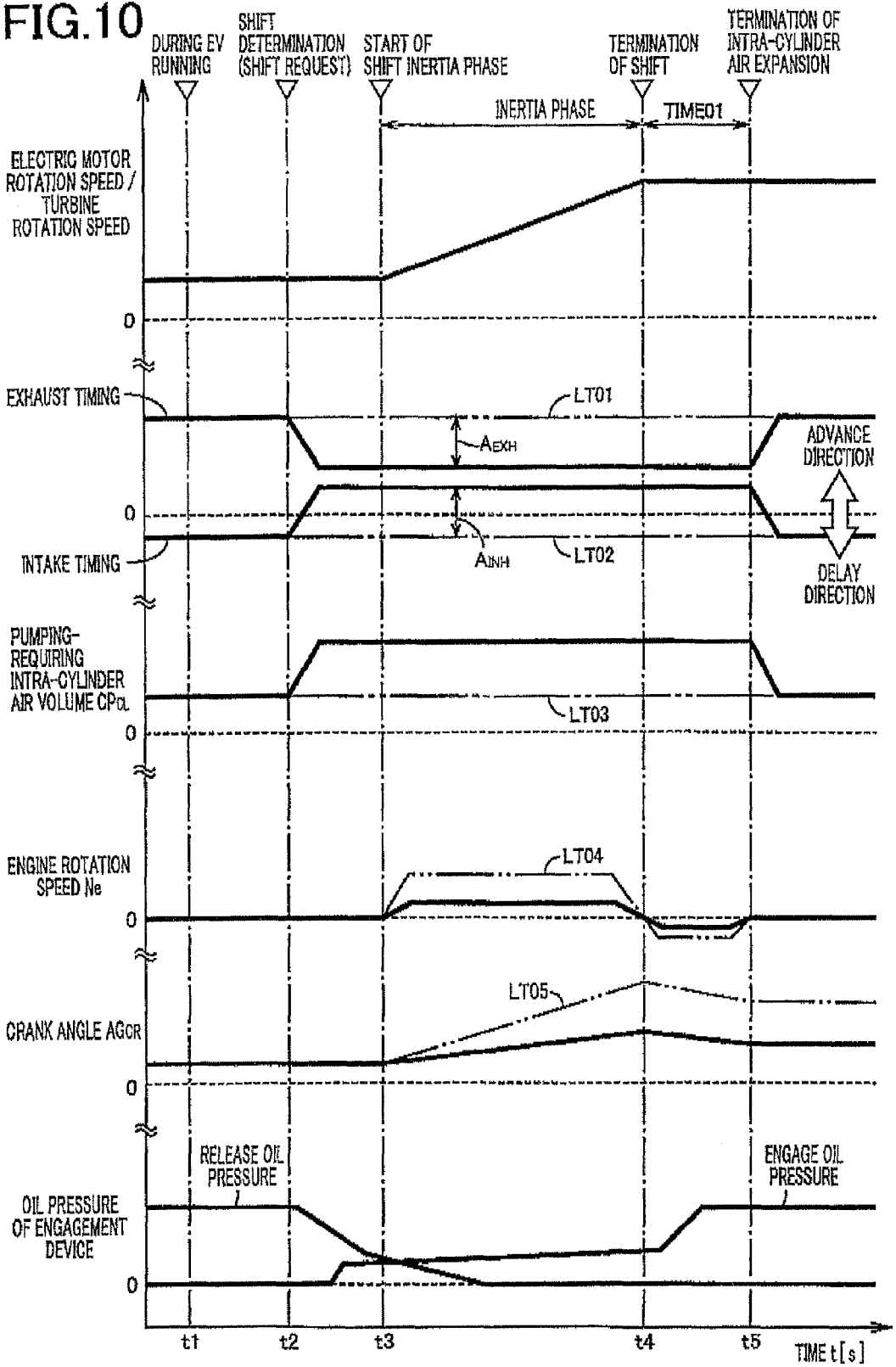
FIG. 10 is a time chart for explaining the engine rotation resistance control taking as an example the case of a downshift from the third gear (3rd) to the second gear (2nd) of the automatic transmission during EV running in the vehicle drive device of FIG. 1.

FIG. 10 is a time chart for explaining the engine rotation resistance control taking as an example the case of a downshift from the third gear (3rd) to the second gear (2nd) of the automatic transmission 18 during EV running. In FIG. 10, solid lines indicate time charts when the engine rotation resistance control is provided and dashed-two dotted lines LT01, LT02, LT03, LT04, and LT05 indicate time charts when the engine rotation resistance control is not provided. In the time charts of intake timing and exhaust timing of FIG. 10, the unit of the vertical axis is "degree" and the zero degree on the vertical axis is a reference angle and is an angle corresponding to the top dead center, for example.

In FIG. 10, the vehicle 8 is in the EV running at time t1 or later. At time t2, a shift determination (shift request) is made to indicate that the automatic transmission 18 should be downshifted from the third gear to the second gear. This means that, at time t2, the vehicle state traverses the downshift line (see FIG. 6) from the third gear to the second gear. Therefore, the downshift of the automatic transmission 18 is started from time t2. Specifically, from time t2, a release oil pressure supplied to the clutch C3 for release operation of the clutch C3, i.e., a release-side engagement element, starts being reduced, and an engagement oil pressure supplied to the brake B1 for engagement operation of the brake B1, i.e., an engagement-side engagement element, starts being increased.

Time t3 is the time of start of the inertia phase in the shift of the automatic transmission 18 and time t4 is the time of end of the inertia phase in the shift. Therefore, the turbine rotation speed Nt increases in accordance with the progress of the shift of the automatic transmission 18 between time t3 and time t4 and becomes constant after time t4. Time t5 indicates the time when the post-shift extension time TIME01 has elapsed from time t4, i.e., the time of completion of the shift. The turbine rotation speed Nt is the same as a rotation speed Nmg of the electric motor 21 for running (hereinafter referred to as "electric motor rotation speed Nmg") in this embodiment as can be seen from FIG. 1.

Since the vehicle 8 is already in the EV running at time t1 in FIG. 10, the engine rotation resistance control means 132 starts the engine rotation resistance control at time t2, i.e., at the time of start of the shift. In the engine rotation resistance control, the opening/closing timings of one or both of the intake valve 62 and the exhaust valve 66 are changed such that the engine rotation resistance due to pumping of the engine 12 is increased. For example, the engine rotation resistance control means 132 can shift the opening/closing timings of the intake valve 62 with the intake valve drive device 64 in the advance direction as compared to the time of engine start or can shift the opening/closing timings of the exhaust valve 66 with the exhaust valve drive device 68 in the delay direction as compared to the time of engine start, thereby increasing the engine rotation resistance. The engine rotation resistance control in this embodiment changes the opening/closing timings (the opening timing and the closing timing) of both the intake valve 62 and the exhaust valve 66. In other words, from time t2 of FIG. 10, the engine rotation resistance control means 132 shifts the opening/closing timings of the intake valve 62 with the intake valve drive device 64 in the advance direction as compared to the time of engine start and shifts the opening/closing timings of the exhaust valve 66 with the exhaust valve drive device 68 in the delay direction as compared to the time of engine start. Therefore, after time t2 in FIG. 10, the opening/closing timings of the intake valve 62 are, i.e., intake timing is shifted in the advance direction as compared to the timing before time t2 and the opening/closing timings of the exhaust valve 66 are, i.e., exhaust timing is shifted in the delay direction as compared to the timing before time t2. These changes in the intake timing and the exhaust timing increase an intra-cylinder air volume $CP_{CL}$, i.e., the intra-cylinder compression volume requiring the pumping of the engine 12 associated with the rotation of the crankshaft 14 from time t2. In other words, in a cylinder in the compression stroke, an air quantity (e.g., in g) compressed in the combustion chamber 52 in accordance with the rotation of the engine 12 (the crankshaft 14) is increased from time t2. As the pumping-requiring intra-cylinder air volume $CP_{CL}$ increases, a torque required for climbing over the top dead center of the cylinder in the compression stroke becomes larger and the engine rotation resistance becomes larger.

In the engine rotation resistance control, the engine rotation resistance control means 132 completes the control to vary the engine rotation resistance to increase as compared to the time of engine start, after the shift determination before the transmission input shaft rotation speed $N_{ATIN}$ (=turbine rotation speed Nt) starts changing in accordance with the progress of the shift of the automatic transmission 18, specifically, between time t2 and time t3. In short, the engine rotation resistance control means 132 completes the control to vary the engine rotation resistance to increase as compared to the time of engine start, before a gear ratio starts changing in the shift of the automatic transmission 18. Therefore, as depicted in FIG. 10, between time t2 and time t3, the opening/closing timings (intake timing) of the intake valve 62 is changed in the advance direction over time, and the opening/closing timings (exhaust timing) of the exhaust valve 66 is changed in the delay direction over time. The changes in intake timing and exhaust timing over time are completed before time t3 and the intake timing and the exhaust timing are maintained constant after time t3 until the engine rotation resistance control is terminated, i.e., until time t5. Therefore, in the engine rotation resistance control, the engine rotation resistance control means 132 makes the engine rotation resistance larger as compared to the time of engine start, during a change in gear ratio (time t3 to t4) in the shift of the automatic transmission 18.

Figure 11:
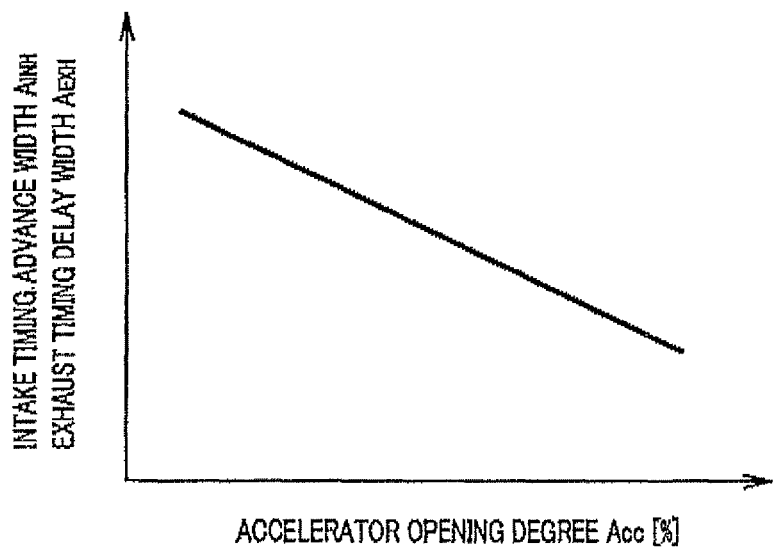
FIG. 11 is a diagram representing the predefined relationship between each of the intake timing advance width $A_{INH}$ and the exhaust timing delay width $A_{EXH}$, and the accelerator opening degree depicted in FIG. 10.
Figure 12:
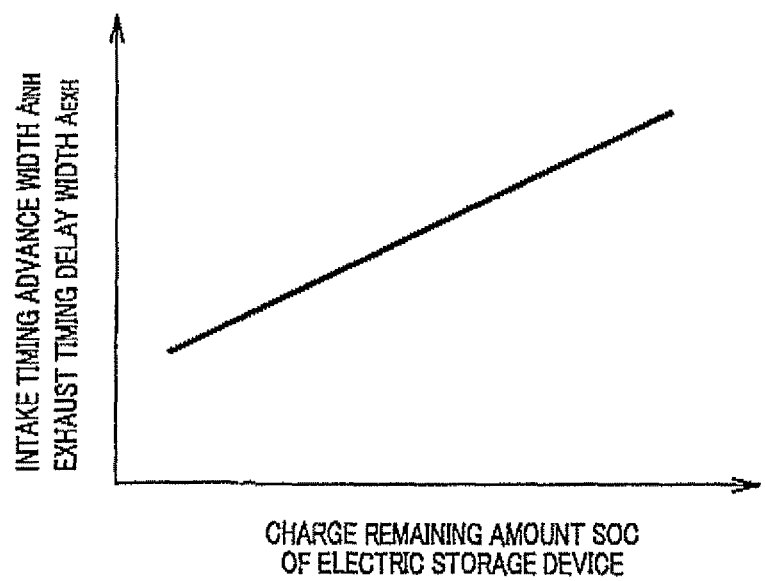
FIG. 12 is a diagram representing the predefined relationship between each of the intake timing advance width $A_{INH}$ and the exhaust timing delay width $A_{EXH}$, and the charge remaining amount of the electric storage device depicted in FIG. 10.

In the engine rotation resistance control, the engine rotation resistance control means 132 sets the engine rotation resistance during engine stop based on at least one of a request from a driver (driver's request) and a vehicle state. Specifically, the engine rotation resistance control means 132 determines an intake timing advance width $A_{INH}$ and an exhaust timing delay width $A_{EXH}$ based on at least one of the driver's request and the vehicle state, shifts the intake timing in the advance direction by the determined intake timing advance width $A_{INH}$ as compared to the time of engine start, and shifts the exhaust timing in the delay direction by the determined exhaust timing delay width $A_{EXH}$ as compared to the time of engine start. Therefore, as depicted in FIG. 10, in the engine rotation resistance control, as compared to the time of engine start, i.e., as compared to before time t2 preceding to the start of the engine rotation resistance control, the intake timing is shifted by the intake timing advance width $A_{INH}$ in the advance direction and the exhaust timing is shifted by the exhaust timing delay width $A_{EXH}$ in the delay direction. Examples of the driver's request include air conditioning setting in a vehicle compartment, the accelerator opening degree Acc, etc., and examples of the vehicle state include the charge remaining amount SOC of the electric storage device 37, the vehicle speed V, the crank angle $AG_{CR}$ at the time of engine stop, etc. For example, when the accelerator opening degree Acc is larger or the charge remaining amount SOC is lower at the time of determination of the intake timing advance width $A_{INH}$ and the exhaust timing delay width $A_{EXH}$ preceding to the start of the engine rotation resistance control, it can be said from predefined relationship as depicted in FIGS. 11 and 12 that the engine is more likely to be started in this situation and, therefore, each of the intake timing advance width $A_{INH}$ and the exhaust timing delay width $A_{EXH}$ is set smaller. The determined intake timing advance width $A_{INH}$ and exhaust timing delay width $A_{EXH}$ may have the absolute values same as or different from each other.

If the crank angle stability determining means 128 determines that the crank angle $AG_{CR}$ of the engine 12 in the automatic stop period enters the crank angle stable state after completion of the shift of the automatic transmission 18, the engine rotation resistance control means 132 terminates the engine rotation resistance control. Therefore, after the predefined post-shift extension time TIME01 has elapsed from completion of the shift of the automatic transmission 18, the engine rotation resistance control is terminated. Therefore, as depicted in FIG. 10, after time t5 when the post-shift extension time TIME01 has elapsed from time t4 at the completion of the shift, the engine rotation resistance control is terminated, and the intake timing and the exhaust timing are returned after time t5 to the state before time t2, i.e., the state at the time of engine start. As depicted in FIG. 10, between time t4 and time t5 after completion of the shift, since the air compressed in any cylinder of the engine 12 is expanded in accordance with the termination of increase in the turbine rotation speed Nt in the inertia phase, the crankshaft 14 of the engine 12 rotates in the opposite direction as compared to before time t4 and the crank angle $AG_{CR}$ gradually returns from time t4 to time t5. After time t5 when the post-shift extension time TIME01 has elapsed, the engine rotation speed Ne becomes zero and the crank angle $AG_{CR}$ no longer changes, i.e., the crank angle $AG_{CR}$ is in the crank angle stable state.

Since the engine rotation resistance control means 132 provides the engine rotation resistance control in a shift period of the automatic transmission 18 during EV running, a variation width of the engine rotation speed Ne in the shift period is suppressed at a smaller level as compared to when the engine rotation resistance control is not provided, i.e., when the intake timing and the exhaust timing are not changed (see dashed-two dotted line LT04), as depicted in the time chart of the engine rotation speed Ne of FIG. 10. As a result, at time t5 after completion of the shift, the variation width of the crank angle $AG_{CR}$ of the engine 12 relative to before time t2 is smaller as compared to when the engine rotation resistance control is not provided (see dashed-two dotted line LT05). Therefore, the engine rotation resistance control has the effect of retaining the crank angle $AG_{CR}$ during engine stop without change.

Returning to FIG. 9, in the engine rotation resistance control, the engine rotation resistance control means 132 shifts the intake timing with the intake valve drive device 64 in the advance direction and shifts the exhaust timing with the exhaust valve drive device 68 in the delay direction as described above; however, the engine rotation resistance may be increased by another method. For example, in the engine rotation resistance control, the engine rotation resistance control means 132 may further close the electric throttle valve 70 as compared to the time of engine start, thereby increasing the engine rotation resistance. This is because when the electric throttle valve 70 is further closed, i.e., the throttle opening degree $\theta_{TH}$ is made smaller, the intake resistance of the engine 12 is increased and the engine rotation resistance is increased. Therefore, if the engine rotation resistance is increased with the electric throttle valve 70, the engine rotation resistance control means 132 fully closes the electric throttle valve 70, for example. The electric throttle valve 70 may further be closed as compared to the time of engine start instead of or in addition to the changes of the intake timing and the exhaust timing.

At the time of engine start, the engine rotation resistance control means 132 adjusts the intake timing and the exhaust timing within adjustable ranges thereof so as to minimize the engine rotation resistance before starting the engine 12 with the engine start/stop control means 118. Specifically, engine-start-time intake/exhaust timing control is provided to set the opening/closing timings (intake timing) of the intake valve 62 with the intake valve drive device 64 at the most delayed position (most delayed intake timing) located on the most delayed side within the adjustable range thereof and to set the opening/closing timings (exhaust timing) of the exhaust valve 66 with the exhaust valve drive device 68 at the most advanced position (most advanced exhaust timing) located on the most advanced side within the adjustable range thereof. Since such setting of the intake timing and the exhaust timing minimizes the engine rotation resistance due to the pumping of the engine 12 associated with the rotation of the crankshaft 14, the engine 12 is started after the provision of the engine-start-time intake/exhaust timing control is completed. Therefore, in this embodiment, the intake timing at the time of engine start refers to the most delayed intake timing, and the exhaust timing at the time of engine start refers to the most advanced exhaust timing. Since the intake timing and the exhaust timing at the time of engine start are adjusted as described above, the engine rotation resistance control means 132 may provide the engine-start-time intake/exhaust timing control of setting the intake timing to the most delayed intake timing and the exhaust timing to the most advanced exhaust timing on the condition that the engine start request is made in the automatic stop period of the engine 12; however, in this embodiment, as depicted in FIG. 10, the engine-start-time intake/exhaust timing control is provided in the non-shift period of the automatic transmission 18 while the engine rotation resistance control is not provided or, in particular, after the post-shift extension time TIME01 has elapsed from completion of the shift of the automatic transmission 18. Whether the engine start request is made is based on the determination by the engine start time determining means 130.

The adjustment of the intake timing and the exhaust timing at the time of engine start is the same even when the engine start request is made during the provision of the engine rotation resistance control. Therefore, if the engine start request is made while the engine rotation resistance is set larger in the engine rotation resistance control as compared to the time of engine start, the engine rotation resistance control means 132 provides the engine-start-time intake/exhaust timing control to return the engine rotation resistance to the level at the time of engine start before causing the engine start/stop control means 118 to start the engine 12.

Figure 13:
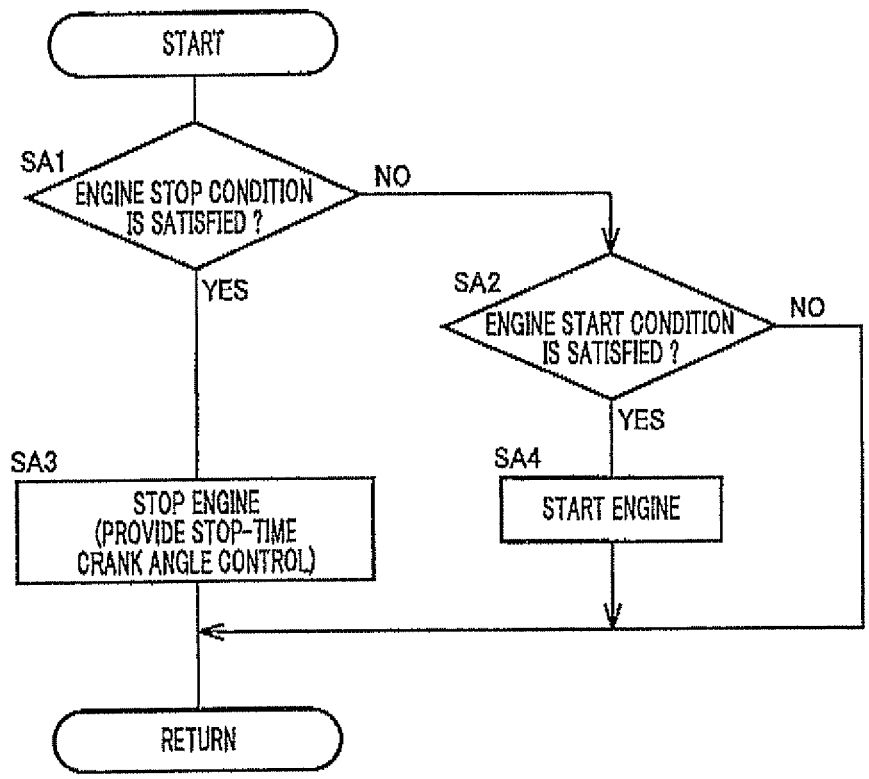
FIG. 13 is a flowchart for explaining a first main portion of control operation of the electronic control device of FIG. 9, i.e., control operation of automatically stopping and restarting the engine.

FIG. 13 is a flowchart for explaining a first main portion of control operation of the electronic control device 40, i.e., control operation of automatically stopping and restarting the engine 12 and is repeatedly executed with an extremely short cycle time, for example, on the order of few msec to a few tens of msec. The control operation depicted in FIG. 13 is performed solely or concurrently with another control operation. All the steps depicted in FIG. 13 correspond to the engine start/stop control means 118.

In FIG. 13, first, at a step (hereinafter, "step" will be omitted) SA1, it is determined whether the engine stop condition is satisfied. If the determination at SA1 is affirmative, i.e., if the engine stop condition is satisfied, the operation goes to SA3. On the other hand, if the determination at SA1 is negative, the operation goes to SA2.

At SA2, it is determined whether the engine start condition is satisfied. If the determination at SA2 is affirmative, i.e., if the engine start condition is satisfied, the operation goes to SA4. On the other hand, if the determination at SA2 is negative, the flowchart is terminated.

At SA3, the engine 12 is stopped. When the engine 12 is automatically stopped, the stop-time crank angle control is provided and, as a result, the engine 12 is stopped such that the engine crank angle $AG_{CR}$ immediately after engine stop falls within the crank angle stop range $AG_{ST}$.

At SA4, the engine 12 is started. However, the engine 12 is cranked and started after the completion of adjustment of the intake timing of the intake valve 62 and the exhaust timing of the exhaust valve 66 through the engine-start-time intake/exhaust timing control provided at SC6 or SC9 of FIG. 15 described later.

Figure 14:
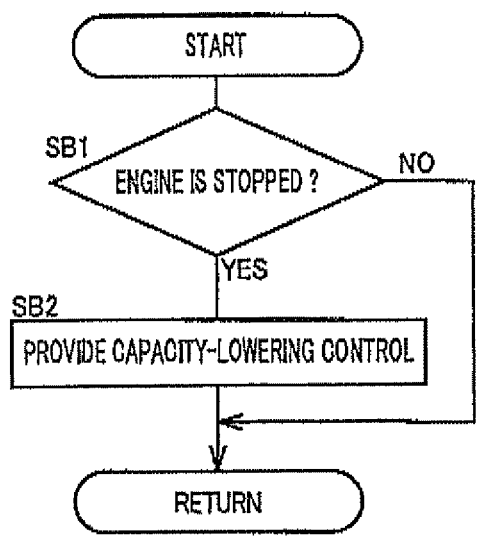
FIG. 14 is a flowchart for explaining a second main portion of control operation of the electronic control device of FIG. 9, i.e., control operation of providing the capacity-lowering control.

FIG. 14 is a flowchart for explaining a second main portion of control operation of the electronic control device 40, i.e., control operation of providing the capacity-lowering control and is repeatedly executed with an extremely short cycle time, for example, on the order of few msec to a few tens of msec. The control operation depicted in FIG. 14 is performed solely or concurrently with another control operation. All the steps depicted in FIG. 14 correspond to the capacity-lowering control means 120.

In FIG. 14, first, at SB1, it is determined whether the engine 12 is stopped. If the determination at SB1 is negative, this flowchart is terminated. On the other hand, if the determination at SB1 is affirmative, at SB2, the capacity-lowering control is provided to completely engage the brake Bs and non-rotatably fix the stator impeller 16s to reduce the reverse drive capacity coefficient C of the torque converter 16 as compared to a value when the stator impeller 16s is in the free rotation state relative to the transmission case 24, and this flowchart is terminated.

Figure 15:
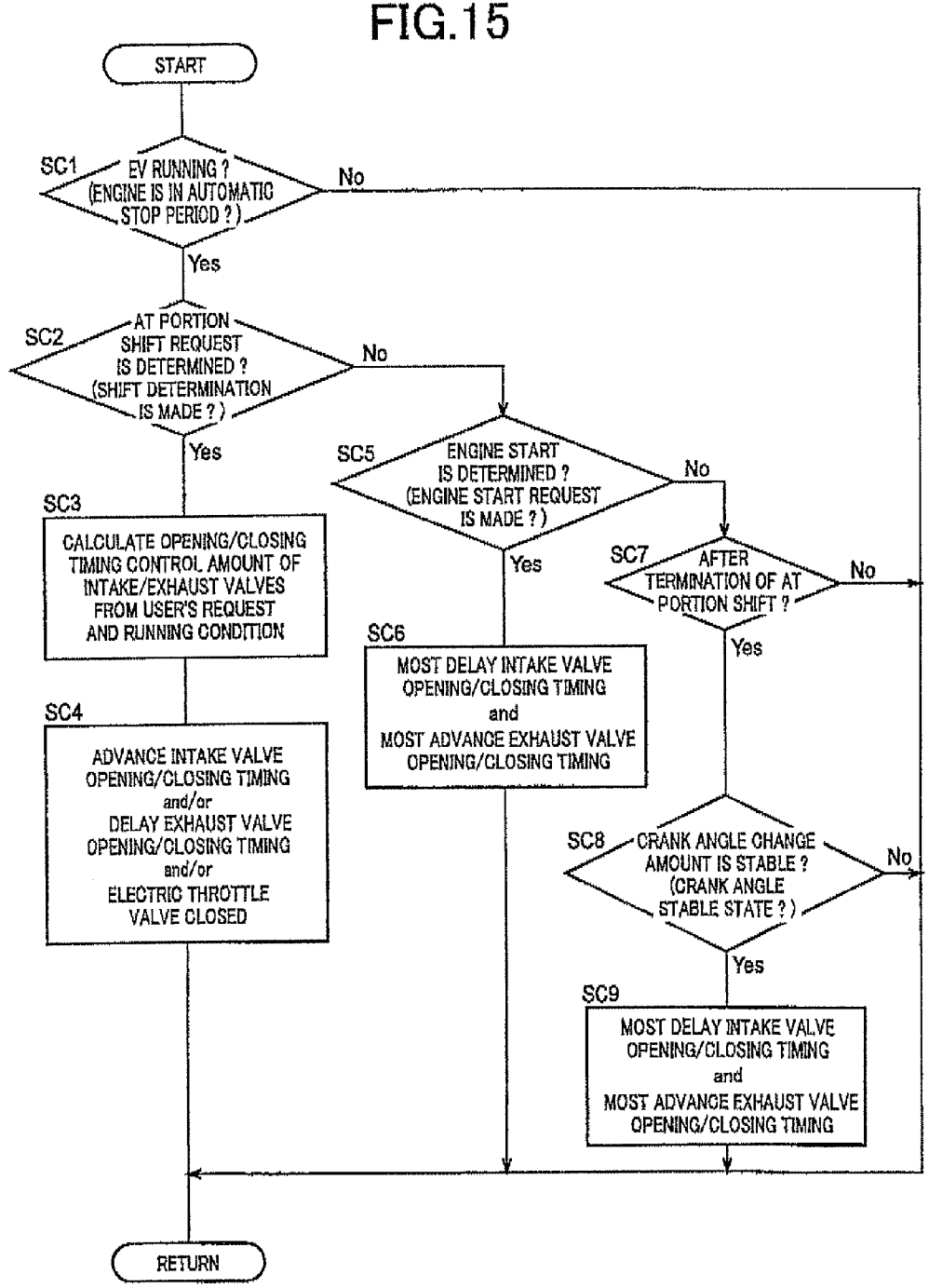
FIG. 15 is a flowchart for explaining a third main portion of control operation of the electronic control device of FIG. 9, i.e., control operation of suppressing a change in the crank angle in the automatic stop period of the engine 12.

FIG. 15 is a flowchart for explaining a third main portion of control operation of the electronic control device 40, i.e., control operation of suppressing a change in the crank angle $AG_{CR}$ in the automatic stop period of the engine 12 and is repeatedly executed with an extremely short cycle time, for example, on the order of few msec to a few tens of msec. The control operation depicted in FIG. 15 is performed solely or concurrently with another control operation.

In FIG. 15, first, at SC1 corresponding to the engine automatic stop period determining means 124, it is determined whether the engine 12 is in the automatic stop period. For example, during EV running, i.e., vehicle running with the engine 12 stopped, the engine 12 is in the automatic stop period and, therefore, the determination at SC1 is affirmative. If the determination at SC1 is affirmative, i.e., if the engine 12 is in the automatic stop period, the operation goes to SC2. On the other hand, if the determination at SC1 is negative, this flowchart is terminated.

At SC2 corresponding to the shift period determining means 126, it is determined whether the shift determination (shift request) of the automatic transmission 18 is made. An AT portion described in FIG. 15 refers to the automatic transmission 18. If the determination at SC2 is affirmative, i.e., if the shift determination is made, the operation goes to SC3. On the other hand, if the determination at SC2 is negative, the operation goes to SC5.

At SC3 corresponding to the engine rotation resistance control means 132, a control amount is determined in relation to the opening/closing timings of the intake valve 62 and the exhaust valve 66 in the engine rotation resistance control. Specifically, each of the intake timing advance width $A_{INH}$ and the exhaust timing delay width $A_{EXH}$ is calculated and determined based on at least one of the driver's request (user's request) and the vehicle state such as a running condition.

The intake timing advance width $A_{INH}$ may be referred to as an opening/closing timing control amount of the intake valve 62 and the exhaust timing delay width $A_{EXH}$ may be referred to as an opening/closing timing control amount of the exhaust valve 66. The operation goes from SC3 to SC4.

At SC4 corresponding to the engine rotation resistance control means 132, the engine rotation resistance control is provided. Specifically, in the engine rotation resistance control, the opening/closing timings of the intake valve 62 are shifted by the intake valve drive device 64 in the advance direction as compared to the time of engine start, and the opening/closing timings of the exhaust valve 66 are shifted by the exhaust valve drive device 68 in the delay direction as compared to the time of engine start. Control amounts in this case are calculated at SC3. At SC4, the opening/closing timings of only one of the intake valve 62 and the exhaust valve 66 may be changed as compared to the time of engine start. In the engine rotation resistance control, the electric throttle valve 70 may be actuated to be further closed as compared to the time of engine start. If the engine-start-time intake/exhaust timing control is being provided, the engine rotation resistance control is provided after the engine-start-time intake/exhaust timing control is terminated.

At SC5 corresponding to the engine start time determining means 130, it is determined whether the engine start request is made. If the determination at SC5 is affirmative, i.e., the engine start request is made, the operation goes to SC6. On the other hand, if the determination at SC5 is negative, the operation goes to SC7.

At SC6 corresponding to the engine rotation resistance control means 132, the engine-start-time intake/exhaust timing control is provided. If the engine rotation resistance control is being provided, the engine-start-time intake/exhaust timing control is provided after the engine rotation resistance control is terminated. Specifically, in the engine-start-time intake/exhaust timing control, the opening/closing timings of the intake valve 62 are set to the most delayed position and the opening/closing timings of the exhaust valve 66 are set to the most advanced position. After the completion of adjustment of the opening/closing timings of the intake valve 62 and the exhaust valve 66 in the engine-start-time intake/exhaust timing control, the engine 12 is started.

At SC7 corresponding to the shift period determining means 126, it is determined whether it is after completion of the shift of the automatic transmission 18, i.e., whether the shift of the automatic transmission 18 is completed. If the determination at SC7 is affirmative, i.e., if the shift of the automatic transmission 18 is completed, the operation goes to SC8. On the other hand, if the determination at SC7 is negative, this flowchart is terminated.

At SC8 corresponding to the crank angle stability determining means 128, it is determined whether the crank angle $AG_{CR}$ of the engine 12 in the automatic stop period enters the crank angle stable state after completion of the shift of the automatic transmission 18. Although whether the crank angle $AG_{CR}$ enters the crank angle stable state may be determined based on a change in the engine rotation speed Ne or the crank angle $AG_{CR}$ etc., the determination is made based on an elapsed time in this embodiment. Therefore, at SC8, it is determined whether the post-shift extension time TIME01 has elapsed from completion of the shift of the automatic transmission 18. When the post-shift extension time TIME01 has elapsed from completion of the shift, it is determined that the crank angle $AG_{CR}$ enters the crank angle stable state after the shift. If the determination at SC8 is affirmative, i.e., if the post-shift extension time TIME01 has elapsed from completion of the shift of the automatic transmission 18, the operation goes to SC9. On the other hand, if the determination at SC8 is negative, this flowchart is terminated.

At SC9 corresponding to the engine rotation resistance control means 132, if the engine rotation resistance control is being provided, the engine rotation resistance control is terminated. The engine-start-time intake/exhaust timing control is then provided.

This embodiment has the following effects (A1) to (A10).
(A1) According to this embodiment, when the engine 12 is automatically stopped, the engine start/stop control means 118 provides the stop-time crank angle control in which the engine 12 is stopped with the engine crank angle $AG_{CR}$ controlled such that the engine crank angle $AG_{CR}$ at the time of automatic stop of the engine 12 falls within the crank angle stop range $AG_{ST}$. The engine rotation resistance control means 132 provides the engine rotation resistance control in which the engine rotation resistance generated due to a change in air pressure in the combustion chamber 52 of the engine 12 is made larger while the engine 12 is in the automatic stop period, as compared to the time of engine start. Therefore, since the crankshaft 14 of the engine 12 is hardly rotated by an external force while the engine 12 is in the automatic stop period, the crank angle $AG_{CR}$ can be retained during stop of the engine 12 with no or little change. In other words, a change in the engine crank angle $AG_{CR}$ can be reduced during stop of the engine 12. Since the crank angle $AG_{CR}$ at the time of automatic stop of the engine 12 is controlled to fall within the crank angle stop range $AG_{ST}$, if the crank angle stop range $AG_{ST}$ is set to a crank angle range suitable for engine restart, the engine can be stopped at the crank angle $AG_{CR}$ suitable for engine restart in such a manner that the engine starting shock can be reduced. Therefore, since the crankshaft 14 is stopped within or in the vicinity of the crank angle stop range $AG_{ST}$ at the time of restart of the engine 12, when the automatically stopped engine 12 is restarted, favorable engine startability is ensured and the engine can quickly and certainly be started while suppressing a feeling of discomfort brought to a driver. Although it is conceivable that if the crank angle $AG_{CR}$ goes out of the crank angle stop range $AG_{ST}$ in the automatic stop period of the engine 12 for some reason, the electric motor 21 for running rotates the crankshaft 14 to return (correct) the crank angle $AG_{CR}$ into the crank angle stop range $AG_{ST}$ instead of the engine rotation resistance control, such control of returning the crank angle $AG_{CR}$ requires time from the start to the completion of provision because of operations of detecting and correcting a gap of the crank angle $AG_{CR}$ and, if such control is provided each time the crank angle $AG_{CR}$ goes out of the crank angle stop range $AG_{ST}$, the engine cannot quickly be started and a driver may feel discomfort.

(A2) According to this embodiment, in the engine rotation resistance control, the engine rotation resistance control means 132 shifts the opening/closing timings of the intake valve 62 in the advance direction as compared to the time of engine start and shifts the opening/closing timings of the exhaust valve 66 in the delay direction as compared to the time of engine start, thereby increasing the engine rotation resistance; however, the engine rotation resistance may be increased by at least one of shifting the opening/closing timings of the intake valve 62 in the advance direction as compared to the time of engine start and shifting the opening/closing timings of the exhaust valve 66 in the delay direction as compared to the time of engine start. In this case, because an actual vehicle engine often includes the intake valve drive device 64 having a function as the intake valve opening/closing timing changing device and the exhaust valve drive device 68 having a function as the exhaust valve opening/closing timing changing device, the engine 12 including the intake valve drive device 64 and the exhaust valve drive device 68 can easily provide the engine rotation resistance control by utilizing at least one of the intake valve drive device 64 and the exhaust valve drive device 68 without particularly adding a new device.

(A3) According to this embodiment, in the engine rotation resistance control, the engine rotation resistance control means 132 changes the opening/closing timings of the intake valve 62 and the opening/closing timings of the exhaust valve 66 such that an air quantity compressed in the combustion chamber 52 of the engine 12 in accordance with the rotation of the crankshaft 14 is increased, i.e., the intra-cylinder compression volume is increased, thereby increasing the rotation resistance of the engine. Therefore, if the engine 12 includes the intake valve drive device 64 and the exhaust valve drive device 68 as in this embodiment, the engine rotation resistance control can be provided and the engine rotation resistance can quickly and easily be increased and decreased.

(A4) According to this embodiment, in the engine rotation resistance control, the engine rotation resistance control means 132 may further close the electric throttle valve 70 as compared to the time of engine start, thereby increasing the engine rotation resistance. In this case, because an actual vehicle engine often includes the electric throttle valve 70, even if, for example, the intake valve drive device 64 and the exhaust valve drive device 68 do not have the functions as the intake valve opening/closing timing changing device and the exhaust valve opening/closing timing changing device, respectively, the engine rotation resistance control can be provided.

(A5) According to this embodiment, in the engine rotation resistance control, the engine rotation resistance control means 132 sets the engine rotation resistance during engine stop based on at least one of a request from a driver (driver's request) and a vehicle state. Therefore, the rotation resistance of the engine 12 can be set depending on the driver's request or the vehicle state so as to satisfy both the engine startability, such as reduction in engine starting shock, and the reduction in change amount of the engine crank angle $AG_{CR}$, for example.

(A6) According to this embodiment, the vehicle 8 includes the automatic transmission 18 making up a portion of the power transmission path between the engine 12 and the drive wheels 17 and the engine rotation resistance control means 132 provides the engine rotation resistance control while the engine 12 is in the automatic stop period and the automatic transmission 18 is in the shift period, and makes the engine rotation resistance larger during a change in gear ratio in a shift of the automatic transmission 18 as compared to the time of engine start in the engine rotation resistance control. Therefore, although the transmission input shaft rotation speed $N_{ATIN}$ (=turbine rotation speed Nt) significantly changes as depicted in the time chart of FIG. 10 during a change in gear ratio in a shift of the automatic transmission 18 and the crankshaft 14 of the engine 12 is dragged and easily rotated by the change, the engine rotation resistance control can be provided during such a change in gear ratio to increase the engine rotation resistance, thereby suppressing a change in the engine crank angle $AG_{CR}$.

(A7) According to this embodiment, in the engine rotation resistance control, the engine rotation resistance control means 132 completes the control to vary the engine rotation resistance to increase as compared to the time of engine start before a change in gear ratio starts in a shift of the automatic transmission 18. Therefore, since the engine rotation resistance is already increased before the change in gear ratio starts, i.e., before the transmission input shaft rotation speed $N_{ATIN}$ starts changing as the shift progresses, the crankshaft 14 of the engine 12 can sufficiently be restrained from being dragged and rotated by a change in the transmission input shaft rotation speed $N_{ATIN}$ associated with the progress of the shift.

(A8) According to this embodiment, the engine rotation resistance control means 132 terminates the engine rotation resistance control if the crank angle stability determining means 128 determines that the crank angle $AG_{CR}$ of the engine 12 in the automatic stop period enters the crank angle stable state after completion of the shift of the automatic transmission 18. Even if the provision of the engine rotation resistance control increases the engine rotation resistance, a change amount of the engine crank angle $AG_{CR}$ is not zero and a change amount is supposed to be generated to some degree. When a change in the transmission input shaft rotation speed $N_{ATIN}$ is stopped when the shift of the automatic transmission 18 is completed, the crankshaft 14 of the engine 12 is slightly rotated in the opposite direction as compared to during the shift, attempting to return to the engine crank angle $AG_{CR}$ before the start of the shift. Therefore, since the engine rotation resistance control is provided when the crankshaft 14 of the engine 12 attempts to slightly rotate and return immediately after completion of the shift, the returning rotation of the crankshaft 14 can be facilitated to further reduce a change amount of the engine crank angle $AG_{CR}$ when compared between before and after the shift.

(A9) According to this embodiment, the crank angle stability determining means 128 determines that the crank angle $AG_{CR}$ of the engine 12 enters the crank angle stable state if the predefined post-shift extension time TIME01 has elapsed from completion of a shift of the automatic transmission 18. Therefore, whether the crank angle $AG_{CR}$ enters the crank angle stable state can more easily be determined by measuring an elapsed time.

(A10) According to this embodiment, if the engine start request is made while the engine rotation resistance is set larger in the engine rotation resistance control as compared to the time of engine start, the engine rotation resistance control means 132 provides the engine-start-time intake/exhaust timing control to return the engine rotation resistance to the level at the time of engine start before starting the engine 12. Therefore, since the engine is started after the engine rotation resistance is reduced, favorable engine startability can be ensured and, for example, an engine starting shock can be reduced.

Other embodiments of the present invention will be described. In the description of the following embodiments, the mutually overlapping portions of the embodiments are denoted by the same reference numerals and will not be described.

Second Embodiment

Figures 16, 17:
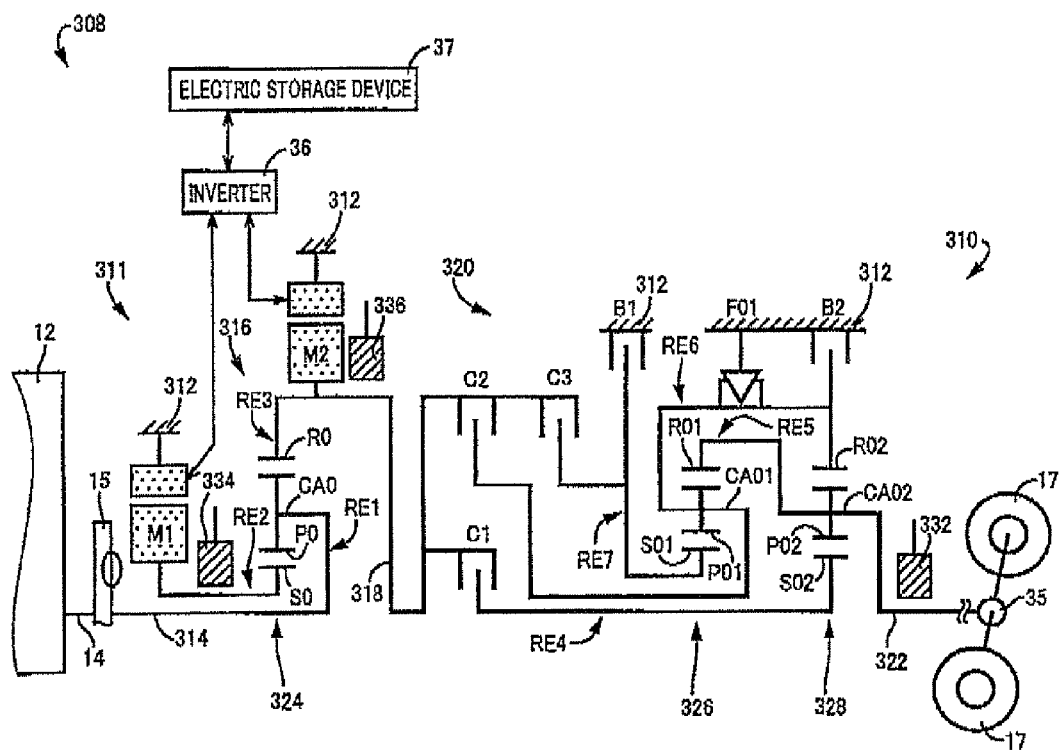
FIG. 16 is a schematic for explaining a configuration of a vehicle drive device of a second embodiment that is another embodiment of the present invention.
FIG. 17 is an operation table of the hydraulic friction engagement devices to establish shift stages in the automatic transmission portion included in the vehicle drive device of FIG. 16.

FIG. 16 is a schematic for explaining a configuration of a vehicle drive device 308 included in a vehicle 306 of a second embodiment that is another embodiment of the present invention. The vehicle drive device 308 includes the engine 12 and a vehicle power transmission device 310 (hereinafter referred to as the "power transmission device 310") interposed between the engine 12 and the drive wheels 17, and is preferably used for hybrid vehicles. In FIG. 16, the power transmission device 310 includes, in series, an input shaft 314 disposed on a common axial center in a transmission case 312 (hereinafter, referred to as the "case 312") that is a non-rotating member attached to a vehicle body; a differential portion 311 as a continuously variable transmission portion coupled to the input shaft 314; an automatic transmission portion 320 as a power transmitting portion serially coupled via a transmitting member 318 on a power transmission path between the differential portion 311 and the drive wheels 17; and an output shaft 322 coupled to the automatic transmission portion 320. The power transmission device 310 is preferably used for, for example, an FR (front-engine rear-drive) type vehicle with the power transmission device 310 longitudinally placed in a vehicle, and is disposed between the engine 12 that is, for example, an internal combustion engine such as a gasoline engine and a diesel engine as a power source for running directly coupled via the flywheel damper 15 to the input shaft 314 and the drive wheels 17 so as to transmit the power from the engine 12 sequentially through a differential gear device 35 making up a portion of the power transmission path and axles etc., to front and rear pairs of the drive wheels 17.

In the power transmission device 310 of this embodiment, the input shaft 314 is serially coupled via the flywheel damper 15 to the crankshaft 14 of the engine 12 and torque is transmitted between the crankshaft 14 of the engine 12 and the input shaft 314 with the pulsation of the torque absorbed by the flywheel damper 15. The power transmission device 310 is symmetrically configured relative to the axial center and, therefore, the lower half is not depicted in the schematic of FIG. 16.

The differential portion 311 is an electric differential portion including a power distribution mechanism 316, a first electric motor M1 coupled to the power distribution mechanism 316 in a power transmittable manner performing as a differential electric motor for controlling the differential state of the power distribution mechanism 316, and a second electric motor M2 coupled to the transmitting member 318 in a power transmittable manner so as to rotate integrally therewith. The transmitting member 318 is an output rotating member of the differential portion 311 and also corresponds to an input rotating member of the automatic transmission portion 320.

The first electric motor M1 and the second electric motor M2 (hereinafter referred to as electric motors M when the electric motors M1 and M2 are not particularly distinguished) are so-called motor generators having a function as a motor generating a mechanical drive force from electric energy and a function as an electric generator generating electric energy from a mechanical drive force. In short, the first electric motor M1 and the second electric motor M2 are the same motor generators as the electric motor 21 for running of the first embodiment. In the power transmission device 310, an electric motor M performs operations such as generating electric energy through regeneration from a drive force generated by another power source to supply the electric energy to the other electric motor M through the inverter 36 or to charge the electric storage device 37 with the electric energy.

The first electric motor M1 at least includes a generator (electric generation) function for generating a reaction force. The second electric motor M2 is coupled to the drive wheels 17 in a power transmittable manner and at least includes a motor (electric motor) function for acting as an electric motor for running outputting a drive force as a second drive force source for running. Preferably, the first electric motor M1 and the second electric motor M2 are both configured to be capable of continuously changing the electric power generation as electric generators. The first electric motor M1 is disposed with an M1 rotation speed sensor 334 consisting of a resolver etc., and the M1 rotation speed sensor 334 detects a rotation speed $N_{M1}$ of the first electric motor M1 (hereinafter referred to as the "first electric motor rotation speed $N_{M1}$") and the rotation direction thereof. The second electric motor M2 is disposed with an M2 rotation speed sensor 336 consisting of a resolver etc., and the M2 rotation speed sensor 336 detects a rotation speed $N_{M2}$ of the second electric motor M2 (hereinafter referred to as the "second electric motor rotation speed $N_{M2}$") and the rotation direction thereof. The first electric motor M1 and the second electric motor M2 are included within the case 312 that is a housing of the power transmission device 310 and are cooled by the operating oil of the automatic transmission portion 320, which is the operating fluid of the power transmission device 310.

The power distribution mechanism 316 is a differential mechanism coupled between the engine 12 and the automatic transmission portion 320, is mainly made up of a single pinion type differential-portion planetary gear device 324 having a predefined gear ratio ρ0 of about "0.416", for example, and is a mechanical mechanism that mechanically distributes the output of engine 12 input to the input shaft 314. The differential-portion planetary gear device 324 includes a differential-portion sun gear S0, a differential-portion planetary gear P0, a differential-portion carrier CA0 supporting the differential-portion planetary gear P0 in a rotatable and revolvable manner, and a differential-portion ring gear R0 engaging via the differential-portion planetary gear P0 with the differential-portion sun gear S0, as rotating elements (elements). When ZS0 denotes the number of teeth of the differential-portion sun gear S0 and ZR0 denotes the number of teeth of the differential-portion ring gear R0, the gear ratio ρ0 is ZS0/ZR0.

In the power distribution mechanism 316, the differential-portion carrier CA0 is coupled to the input shaft 314, i.e., the engine 12; the differential-portion sun gear S0 is coupled to the first electric motor M1; and the differential-portion ring gear R0 is coupled to the transmitting member 318. The power distribution mechanism 316 configured as described above is put into a differential enabled state (differential state) in which a differential action is made operative, i.e., the differential action is achieved by enabling the three elements of the differential-portion planetary gear device 324, i.e., the differential-portion sun gear S0, the differential-portion carrier CA0, and the differential-portion ring gear R0 to rotate relative to each other and, therefore, the output of the engine 12 is distributed to the first electric motor M1 and the transmitting member 318, and since the electric energy generated by the first electric motor M1 from a portion of the distributed output of the engine 12 is accumulated and used for rotationally driving the second electric motor M2, the differential portion 311 (the power distribution mechanism 316) is allowed to function as an electric differential device and, for example, the differential portion 311 is put into a so-called continuously variable transmission state (electric CVT state), and the rotation of the transmitting member 318 is continuously varied regardless of a predefined rotation of the engine 12. Therefore, when the power distribution mechanism 316 is put into the differential state, the differential portion 311 is also put into the differential state, and the differential portion 311 is put into the continuously variable transmission state to function as an electric continuously variable transmission having a gear ratio γ0 (rotation speed $N_{IN}$ of the input shaft 314/rotation speed $N_{318}$ of the transmitting member 318) continuously varied from a minimum value γ0min to a maximum value γ0max. When the power distribution mechanism 316 is put into the differential state in this way, an operating state (operation point) is controlled in one or both of the first electric motor M1 and the second electric motor M2 coupled to the power distribution mechanism 316 (the differential portion 311) in a power transmittable manner, thereby controlling the differential state of the power distribution mechanism 316, i.e., the differential state of the rotation speed of the input shaft 314 and the rotation speed of the transmitting member 318. In this embodiment, as can be seen from FIG. 16, the rotation speed $N_{IN}$ of the input shaft 314 (hereinafter referred to as "input shaft rotation speed $N_{IN}$") is the same rotation speed as the engine rotation speed Ne.

The automatic transmission portion 320 includes a single pinion type first planetary gear device 326 and a single pinion type second planetary gear device 328, makes up a portion of the power transmission path between the engine 12 and the drive wheels 17, and is a planetary-gear type multistage transmission acting as a stepped automatic transmission with a plurality of gear ratios $γ_{AT}$ mechanically set in a stepwise manner. In other words, the automatic transmission portion 320 is shifted when one shift stage is switched to another shift stage in a plurality of shift stages (1th to 4th) mechanically set in advance with the gear ratios $γ_{AT}$ different from each other. Since the second electric motor M2 is coupled to the transmitting member 318 as depicted in FIG. 16, it can be said that the automatic transmission portion 320 is an automatic transmission making up a portion of the power transmission path between the second electric motor M2 and the drive wheels 17. The first planetary gear device 326 includes a first sun gear S01, a first planetary gear P01, a first carrier CA01 supporting the first planetary gear P01 in a rotatable and revolvable manner, and a first ring gear R01 engaging via the first planetary gear P01 with the first sun gear S01 and has a predefined gear ratio ρ1 of about "0.488", for example. The second planetary gear device 328 includes a second sun gear S02, a second planetary gear P02, a second carrier CA02 supporting the second planetary gear P02 in a rotatable and revolvable manner, and a second ring gear R02 engaging via the second planetary gear P02 with the second sun gear S02 and has a predefined gear ratio ρ2 of about "0.455", for example. When ZS01, ZR01, ZS02, and ZR02 respectively denote the number of teeth of the first sun gear S01, the number of teeth of the first ring gear R01, the number of teeth of the second sun gear S02, and the number of teeth of the second ring gear R02, the gear ratio ρ1 is ZS01/ZR01 and the gear ratio ρ2 is ZS02/ZR02.

In the automatic transmission portion 320, the first sun gear S01 is coupled via a third clutch C3 to the transmitting member 318 and is selectively coupled via a first brake B1 to the case 312; the first carrier CA01 and the second ring gear R02 are integrally coupled to each other, are coupled via the second clutch C2 to the transmitting member 318, and are selectively coupled via the second brake B2 to the case 312; the first ring gear R01 and the second carrier CA02 are integrally coupled to each other and are coupled to the output shaft 322; and the second sun gear S02 is selectively coupled via the first clutch C1 to the transmitting member 318. The first carrier CA01 and the second ring gear R02 are coupled via a unidirectional clutch F01 to the case 312 that is a non-rotating member to allow rotation in the same direction as the engine 12 and to prohibit rotation in the opposite direction. As a result, the first carrier CA01 and the second ring gear R02 act as rotating members unable to rotate reversely. The power transmission device 310 includes an output shaft rotation speed sensor 332 and the output shaft rotation speed sensor 332 detects a rotation speed $N_{OUT}$ of the output shaft 322 (hereinafter referred to as "output shaft rotation speed $N_{OUT}$").

The automatic transmission portion 320 configured as above is shifted by releasing release-side engagement devices (release-side engagement elements) and engaging engagement-side engagement devices (engagement-side engagement elements). In other words, in the automatic transmission portion 320, a clutch-to-clutch shift is executed by changing gripped engagement elements and a plurality of gear stages (shift stages) are selectively established to acquire a gear ratio $\gamma_{AT}$ (=rotation speed $N_{318}$ of the transmitting member 318/ rotation speed $N_{OUT}$ of the output shaft 322) varied with a substantially equal ratio for each gear stage. Since the gear ratio $\gamma_{AT}$ is set to be varied with a substantially equal ratio, from another viewpoint, it can be said that a difference in the gear ratio $\gamma_{AT}$ (a gear ratio step) between shift stages adjacent to each other in the automatic transmission portion 320 is set larger when the shift stages are on the lower vehicle speed side. For example, as depicted in an engagement operation table of FIG. 17, a first speed gear stage with a gear ratio of about "3.20" is established by the engagement of the first clutch C1 and the unidirectional clutch F01; a second speed gear stage with a gear ratio of about "1.72" is established by the engagement of the first clutch C1 and the first brake B1; a third speed gear stage with a gear ratio of about "1.00" is established by the engagement of the first clutch C1 and the second clutch C2; a fourth speed gear stage with a gear ratio of about "0.67" is established by the engagement of the second clutch C2 and the first brake B1; and a reverse gear stage with a gear ratio of about "2.04" is established by the engagement of the third clutch C3 and the second brake B2. A neutral "N" state is achieved by the release of the first clutch C1, the second clutch C2, the third clutch C3, the first brake B1, and the second brake B2. At the time of engine braking in the first speed gear stage, the second brake B2 is engaged.

The power transmission path in the automatic transmission portion 320 is switched between a power transmittable state enabling the power transmission through the power transmission path and a power transmission interrupted state interrupting the power transmission in accordance with a combination of the engagement and release operations of the first clutch C1, the second clutch C2, the third clutch C3, the first brake B1, and the second brake B2. When any one of the first to fourth speed gear stages and the reverse gear stage is established, the power transmission path is put into the power transmittable state and when no gear stage is established, for example, when the neutral "N" state is established, the power transmission path is put into the power transmission interrupted state.

The first clutch C1, the second clutch C2, the third clutch C3, the first brake B1, and the second brake B2 (hereinafter referred to as clutches C and brakes B if not particularly distinguished) disposed in the automatic transmission portion 320 are hydraulic friction engagement devices acting as engagement elements frequently used in conventional vehicle automatic transmissions and are made up of a wet multi-plate type having a hydraulic actuator pressing a plurality of friction plates overlapped with each other or made up of a band brake having a hydraulic actuator fastening one end of one or two bands wrapped around an outer peripheral surface of a rotating drum, for the purpose of selectively coupling members on the both sides of the devices interposed therebetween.

In the power transmission device 310 configured as above, a continuously variable transmission is made up of the differential portion 311 functioning as a continuously variable transmission and the automatic transmission portion 320 as a whole. The differential portion 311 and the automatic transmission portion 320 can form the state equivalent to a stepped transmission by providing control such that the gear ratio of the differential portion 311 is kept constant.

Specifically, when the differential portion 311 functions as a continuously variable transmission and the automatic transmission portion 320 in series with the differential portion 311 functions as a stepped transmission, the rotation speed input to the automatic transmission portion 320, i.e., the rotation speed of the transmitting member 318 (hereinafter referred to as "transmitting member rotation speed $N_{318}$") is varied in a stepless manner for at least one shift stage M of the automatic transmission portion 320, and a stepless gear ratio width is acquired in the shift stage M. Therefore, a general gear ratio $\gamma T$ (=input shaft rotation speed $N_{IN}$/rotation speed $N_{OUT}$ of the output shaft 322) of the power transmission device 310 is acquired in a stepless manner and a continuously variable transmission is formed in the power transmission device 310. The general gear ratio $\gamma T$ of the power transmission device 310 is a total gear ratio $\gamma T$ of the entire power transmission device 310 formed based on the gear ratio $\gamma 0$ of the differential portion 311 and the gear ratio $\gamma_{AT}$ of the automatic transmission portion 320. For example, the transmitting member rotation speed $N_{318}$ is varied in a stepless manner for each gear stage of the first to fourth speed gear stages and the reverse gear stage of the automatic transmission portion 320 described in the engagement operation table of FIG. 17 and a stepless gear ratio width is acquired in each gear stage. Therefore, a gear ratio continuously variable in a stepless manner is achieved between the gear stages and the total gear ratio $\gamma T$ is acquired in a stepless manner for the entire power transmission device 310.

When the gear ratio of the differential portion 311 is controlled and kept constant and the clutches C and the brakes B are selectively engaged and actuated to selectively establish any one of the first to fourth speed gear stages or the reverse gear stage (reverse shift stage), the total gear ratio $\gamma T$ of the power transmission device 310 varying with a substantially equal ratio is acquired for each gear stage. Therefore, the state equivalent to a stepped transmission is formed in the power transmission device 310.

Figure 18:
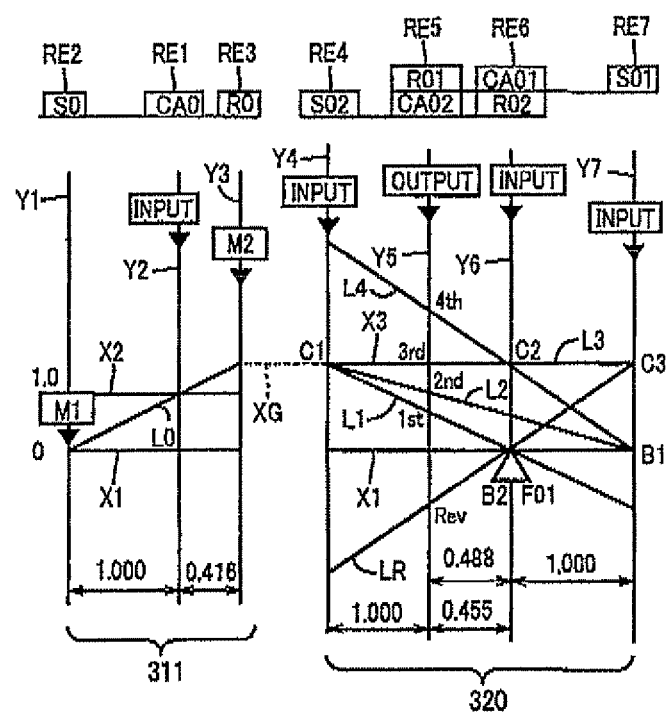
FIG. 18 is a collinear diagram capable of representing on straight lines the relative relationships of the rotation speeds of the rotating elements having a different coupling state for each gear stage in the power transmission device included in the vehicle drive device of FIG. 16.

FIG. 18 is a collinear diagram capable of representing on straight lines the relative relationships of the rotation speeds of the rotating elements having a different coupling state for each gear stage in the power transmission device 310 made up of the differential portion 311 acting as a continuously variable transmission portion or a first transmission portion, and the automatic transmission portion 320 acting as a stepped transmission portion or a second transmission portion. The collinear diagram of FIG. 18 represents two-dimensional coordinates defined by a horizontal axis indicative of a relationship of the gear ratios $\rho$ of the planetary gear devices 324, 326, and 328 and a vertical axis indicative of a relative rotation speed and, a lower horizontal line X1 of three horizontal lines indicates a zero rotation speed; an upper horizontal line X2 indicates a rotation speed "1.0", i.e., a rotation speed Ne of the engine 12 coupled to the input shaft 314; and a horizontal line XG (X3) indicates a rotation speed $N_{318}$ of the transmitting member 318, i.e., a rotation speed of a third rotating element RE3 described later input from the differential portion 311 to the automatic transmission portion 320.

Three vertical lines Y1, Y2, and Y3 corresponding to the three elements of the power distribution mechanism 316 making up the differential portion 311 indicate relative rotation speeds of the differential-portion sun gear S0 corresponding to a second rotating element (second element) RE2, the differential-portion carrier CA0 corresponding to a first rotating element (first element) RE1, and the differential-portion ring gear R0 corresponding to the third rotating element (third element) RE3 in the order from left to right, and the intervals thereof are determined depending on the gear ratio $\rho 0$ of the differential-portion planetary gear device 324. Four vertical lines Y4, Y5, Y6, and Y7 of the automatic transmission portion 320 respectively represent the second sun gear S02 corresponding to a fourth rotating element (fourth element) RE4, the first ring gear R01 and the second carrier CA2 mutually-coupled and corresponding to a fifth rotating element RE5 (fifth element), the first carrier CA01 and the second ring gear R02 mutually-coupled and corresponding to a sixth rotating element (sixth element) RE6, and the first sun gear S01 corresponding to a seventh rotating element (seventh element) RE7 in the order from left to right, and the intervals thereof are determined depending on the gear ratios ρ1 and ρ2 of the first and second planetary gear devices 326 and 328. In the relationship between the vertical axes of the collinear diagram, when an interval corresponding to "1" is defined between a sun gear and a carrier, an interval corresponding to the gear ratio ρ of a planetary gear device is defined between the carrier and a ring gear. Therefore, in the case of the differential portion 311, the interval corresponding to "1" is set between the vertical lines Y1 and Y2, and the interval between the vertical lines Y2 and Y3 is set to the interval corresponding to the gear ratio ρ0. In the case of the automatic transmission portion 320, the interval corresponding to "1" is set between the sun gear and the carrier of each of the first and second planetary gear devices 326 and 328, and the interval corresponding to p is set between the carrier and the ring gear.

When the power transmission device 310 of this embodiment is represented by using the collinear diagram of FIG. 18, the first rotating element RE1 (the differential-portion carrier CA0) of the differential-portion planetary gear device 324 is coupled to the input shaft 314, i.e., the engine 12 in the power distribution mechanism 316 (the differential portion 311); the second rotating element RE2 is coupled to the first electric motor M1; and the third rotating element (the differential-portion ring gear R0) RE3 is coupled to the transmitting member 318 and the second electric motor M2 such that the rotation of the input shaft 314 is transmitted (input) via the transmitting member 318 to the automatic transmission portion 320. A diagonal straight line L0 passing through the intersection point between Y2 and X2 indicates the relationship between the rotation speed of the differential-portion sun gear S0 and the rotation speed of the differential-portion ring gear R0.

For example, the differential portion 311 is put into a differential state where the first rotating element RE1 to the third rotating element RE3 are enabled to rotate relative to each other and, if the rotation speed of the differential-portion ring gear R0 indicated by the intersection point between the straight line L0 and the vertical line Y3 is restricted and kept substantially constant by the vehicle speed V, when the rotation speed of the first electric motor M1 is controlled to increase or decrease the rotation of the differential-portion sun gear S0 indicated by the intersection point between the straight line L0 and the vertical line Y1, the rotation speed of the differential-portion carrier CA0 indicated by the intersection point between the straight line L0 and the vertical line Y2, i.e., the engine rotation speed Ne is increased or decreased. When the rotation speed of the first electric motor M1 is controlled such that the gear ratio γ0 of the differential portion 311 is fixed to "1" to set the rotation of the differential-portion sun gear S0 to the same rotation as the engine rotation speed Ne, the straight line L0 is matched to the horizontal line X2, and the rotation speed of the differential-portion ring gear R0, i.e., the transmitting member 318 is rotated at the same rotation as the engine rotation speed Ne. Alternatively, when the rotation speed of the first electric motor M1 is controlled such that the gear ratio γ0 of the differential portion 311 is fixed to a value smaller than "1", for example, about 0.7 to set the rotation of the differential-portion sun gear S0 to zero, the straight line L0 is put into the state depicted in FIG. 18, and the transmitting member 318 is rotated at a speed increased from the engine rotation speed Ne.

In the automatic transmission portion 320, the fourth rotating element RE4 is selectively coupled to the transmitting member 318 via the first clutch C1; the fifth rotating element RE5 is coupled to the output shaft 322; the sixth rotating element RE6 is selectively coupled via the second clutch C2 to the transmitting member 318 and also selectively coupled via the second brake B2 to the case 312; and the seventh rotating element RE7 is selectively coupled via the third clutch C3 to the transmitting member 318 and also selectively coupled via the first brake B1 to the case 312.

In the automatic transmission portion 320, as depicted in FIG. 18, when the first clutch C1 and the second brake B2 are engaged, the rotation speed of the output shaft 322 at a first speed (1st) is indicated by the intersection point between a diagonal straight line L1 passing through the intersection point between the vertical line Y4 indicative of the rotation speed of the fourth rotating element RE4 and the horizontal line X3 and the intersection point between the vertical line Y6 indicative of the rotation speed of the sixth rotating element RE6 and the horizontal line X1, and the vertical line Y5 indicative of the rotation speed of the fifth rotating element RE5 coupled to the output shaft 322. Similarly, the rotation speed of the output shaft 322 at a second speed (2nd) is indicated by the intersection point between a diagonal straight line L2 determined by engaging the first clutch C1 and the first brake B1 and the vertical line Y5 indicative of the rotation speed of the fifth rotating element RE5 coupled to the output shaft 322; the rotation speed of the output shaft 322 at a third speed (3rd) is indicated by the intersection point between a horizontal straight line L3 determined by engaging the first clutch C1 and the second clutch C2 and the vertical line Y5 indicative of the rotation speed of the fifth rotating element RE5 coupled to the output shaft 322; and the rotation speed of the output shaft 322 at a fourth speed (4th) is indicated by the intersection point between a diagonal straight line L4 determined by engaging the second clutch C2 and the first brake B1 and the vertical line Y5 indicative of the rotation speed of the fifth rotating element RE5 coupled to the output shaft 322.

Figure 19:
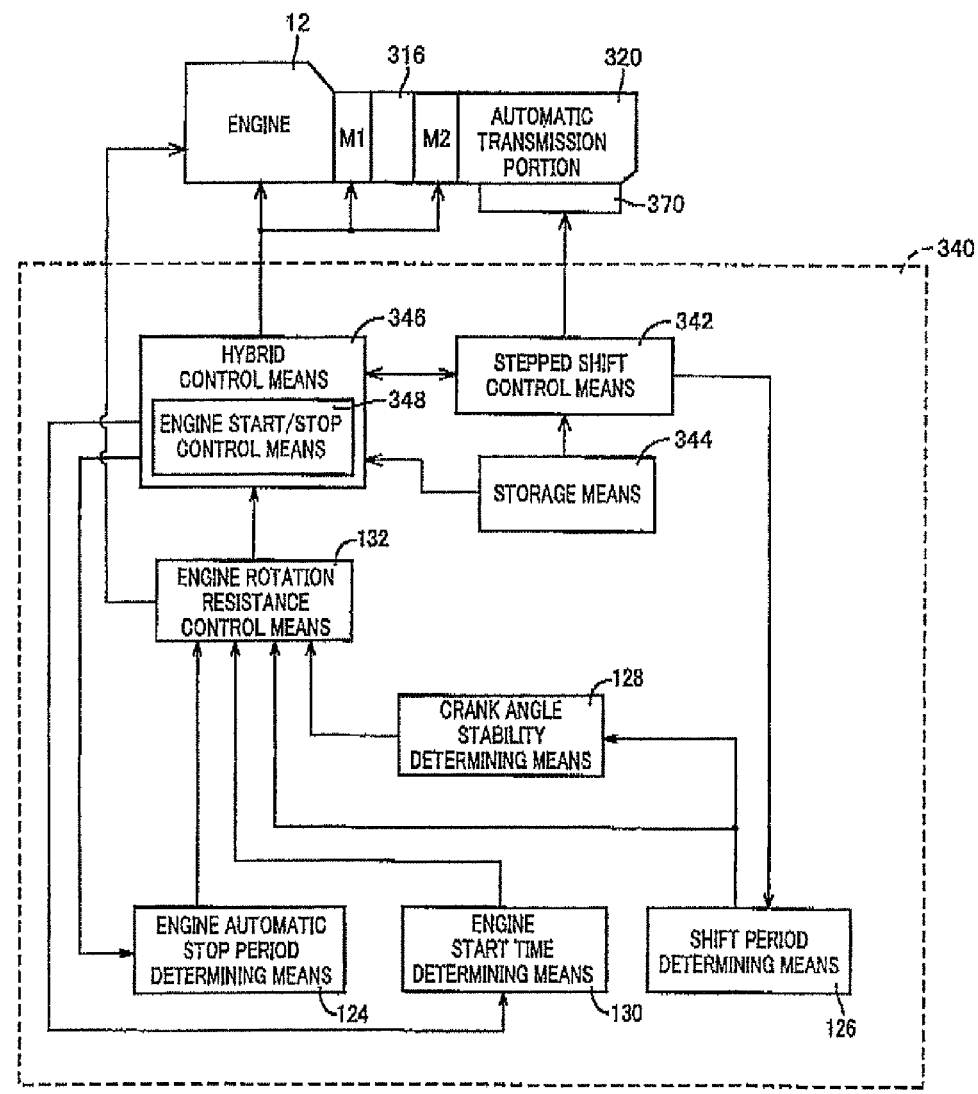
FIG. 19 is a functional block diagram for explaining a main portion of control function included in an electronic control device functioning as a control device of the vehicle drive device of FIG. 16.

FIG. 19 is a functional block diagram for explaining a main portion of control function included in an electronic control device 340. The electronic control device 340 corresponds to the electronic control device 40 of the first embodiment and has a function as a control device of the vehicle drive device 308. In FIG. 19, the electronic control device 340 includes a stepped shift control means 342 as a stepped shift control portion, a storage means 344 as a storage portion, and a hybrid control means 346 as a hybrid control portion. As is the case with the first embodiment, the electronic control device 340 also includes the engine automatic stop period determining means 124, the shift period determining means 126, the crank angle stability determining means 128, the engine start time determining means 130, and the engine rotation resistance control means 132. As depicted in FIG. 19, the hybrid control means 346 includes an engine start/stop control means 348 as an engine start/stop control portion.

The stepped shift control means 342 corresponds to the shift control means 122 of the first embodiment and acts as a shift control means executing a shift of the automatic transmission portion 320. A shift diagram of four forward speeds similar to FIG. 6 is stored in advance in the storage means 344 and, as is the case with the shift control means 122 of the first embodiment, the stepped shift control means 342 determines whether the automatic transmission portion 320 should be shifted from the shift diagram, i.e., determines a shift stage of the automatic transmission 18 to be shifted and provides the automatic shift control of the automatic transmission portion 320 so as to achieve the determined shift stage.

If the automatic shift control of the automatic transmission portion 320 is provided, the stepped shift control means 342 outputs to a hydraulic control circuit 370 a command (a shift output command, an oil pressure command) for engaging and/or releasing the hydraulic friction engagement devices involved with the shift of the automatic transmission portion 320, i.e., a command causing the execution of a clutch-to-clutch shift by releasing the release-side engagement devices and engaging the engagement-side engagement devices involved with the shift of the automatic shifting portion 320 such that the shift stage is achieved in accordance with, for example, the engagement table depicted in FIG. 17. The hydraulic control circuit 370 activates the linear solenoid valve in the hydraulic control circuit 370 to actuate the hydraulic actuator of the hydraulic friction engagement devices involved with the shift such that the automatic shifting portion 320 is shifted by, for example, releasing the release-side engagement devices and engaging the engagement-side engagement devices in accordance with the command.

The hybrid control means 346 has a function as an engine drive control means controlling the drive of the engine 12 and a function as an electric motor operation control means controlling the operations of the first electric motor M1 and the second electric motor M2 as a drive force source or an electric generator through the inverter 36, and provides control of the hybrid drive by the engine 12, the first electric motor M1, and the second electric motor M2 through these control functions.

While operating the engine 12 in an efficient operation range, the hybrid control means 346 changes the drive force distribution between the engine 12 and the second electric motor M2 and the reaction force due to the electric generation by the first electric motor M1 to the optimum state to control the gear ratio γ0 of the differential portion 311 acting as an electric continuously variable transmission. For example, for a running vehicle speed V at a time point, a target (request) output of the vehicle 306 is calculated from the accelerator opening degree Acc that is a driver's required drive force and the vehicle speed V; a necessary total target output is calculated from the target output and a charge request amount of the vehicle 306; a target engine output (request engine output) $P_{ER}$ is calculated such that the total target output is acquired in consideration of a transmission loss, an accessory load, an assist torque of the second electric motor M2, etc.; and the engine 12 is controlled while the output and the electric generation of the electric motors M are controlled so as to achieve the engine rotation speed Ne and the output torque (engine torque) Te of the engine 12 for acquiring the target engine output $P_{ER}$.

As described above, the general gear ratio γT is a gear ratio of the power transmission device 310 as a whole and is determined by the gear ratio $\gamma_{AT}$ of the automatic transmission portion 320 controlled by the stepped shift control means 342 and the gear ratio γ0 of the differential portion 311 controlled by the hybrid control means 346. Therefore, the hybrid control means 346 and the stepped shift control means 342 act as a general gear ratio control means controlling the general gear ratio γT that is a gear ratio of the power transmission device 310 as a whole through the hydraulic control circuit 370, the first electric motor M1, the second electric motor M2, etc.

For example, the hybrid control means 346 provides the control of the engine 12 and the electric motors M in consideration of the shift stages of the automatic transmission portion 320 for the purpose of improvements in power performance and fuel consumption. In such hybrid control, the differential portion 311 is driven to function as an electric continuously variable transmission to match the engine rotation speed Ne determined for operating the engine 12 in an efficient operation range with the rotation speed of the transmitting member 318 determined by the vehicle speed V and the shift stage of the automatic transmission portion 320. Therefore, the storage means 344 preliminarily stores an optimal fuel consumption rate curve (fuel consumption map, relationship), for example, that is a kind of operation curve of the engine 12 empirically obtained in advance so as to satisfy both the drivability and the fuel consumption property during running with continuously variable transmission in the two-dimensional coordinates made up of the engine rotation speed Ne and the engine torque Te; the hybrid control means 346 determines a target value of the total gear ratio γT of the power transmission device 310 such that the engine 12 is operated while an operation point of the engine 12 (hereinafter referred to as an "engine operation point") is moved along the optimal fuel consumption rate curve, for example, such that the engine torque Te and the engine rotation speed Ne are achieved for generating engine output $P_E$ necessary for satisfying the target output (total target output, required drive force); and the hybrid control means 346 changes the output torque $T_{M1}$ of the first electric motor M1 (hereinafter referred to as a "first electric motor torque $T_{M1}$") through the feedback control to control the gear ratio γ0 of the differential portion 311 and control the total gear ratio γT within the available variation range so as to acquire the target value. The engine operation point is an operation point indicative of the operation state of the engine 12 in the two-dimensional coordinates with a coordinate axis of a state amount indicative of the operation state of the engine 12 exemplarily illustrated by the engine rotation speed Ne and the engine torque Te or the like.

In this case, since the hybrid control means 346 supplies the electric energy generated by, for example, the first electric motor M1 through the inverter 36 to the electric storage device 37 and the second electric motor M2, a main portion of the power of the engine 12 (engine output $P_E$) is mechanically transmitted to the transmitting member 318 while a portion of the power of the engine 12 is consumed for the electric generation of the electric motor M and converted into electric energy; the electric energy is supplied through the inverter 36 to the other electric motor M; and a drive force output from the electric motor M due to the electric energy is transmitted to the transmitting member 318. The devices related to the electric energy from the generation by the electric-generation-related electric motor M to the consumption by the drive-related electric motor M make up an electric path from the conversion of a portion of the power of the engine 12 into electric energy to the conversion of the electric energy into mechanical energy. In short, in the differential portion 311, the engine output $P_E$ is transmitted to the transmitting member 318 via two power transmission paths, i.e., a mechanical path of mechanical transmission from the input shaft 314 to the transmitting member 318 and the electric path. The electric storage device 37 is an electric energy source capable of supplying electric power through the inverter 36 to the first electric motor M1 and the second electric motor M2 and receiving the supply of electric power from the electric motors M1 and M2, and is basically an electric energy source capable of giving/receiving electric power to/from each of the first electric motor M1 and the second electric motor M2. In other words, the electric storage device 37 is an electric energy source charged by one or both of the first electric motor M1 and the second electric motor M2 acting as an electric generator rotationally driven by the engine 12 and is a battery such as a lead storage battery, or a capacitor, for example. The first electric motor M1 and the second electric motor M2 can give and receive electric power to/from each other through the inverter 36.

The hybrid control means 346 controls the first electric motor rotation speed $N_{M1}$ and/or the second electric motor rotation speed $N_{M2}$ with the electric CVT function of the differential portion 311 such that the engine rotation speed Ne is maintained substantially constant or rotationally controlled at an arbitrary rotation speed regardless of whether the vehicle 306 is stopped or running. In other words, the hybrid control means 346 can rotationally control the first electric motor rotation speed $N_{M1}$ and/or the second electric motor rotation speed $N_{M2}$ at an arbitrary rotational speed while maintaining or controlling the engine rotation speed Ne substantially constant or at an arbitrary rotation speed.

For example, as can be seen from the collinear diagram of FIG. 18, if the engine rotation speed Ne is raised during vehicle running, the hybrid control means 346 raises the first electric motor rotation speed $N_{M1}$ while maintaining the substantially constant second electric motor rotation speed $N_{M2}$ restricted by the vehicle speed V (the drive wheels 17). If the engine rotation speed Ne is maintained substantially constant during a shift of the automatic transmission portion 320, the hybrid control means 346 changes the first electric motor rotation speed $N_{M1}$ in the direction opposite to the change in the second electric motor rotation speed $N_{M2}$ associated with the shift of the automatic transmission portion 320 while maintaining the engine rotation speed Ne substantially constant.

The hybrid control means 346 uses commands separately or in combination to control opening/closing of the electronic throttle valve 62 with the throttle actuator 64 for throttle control, to control a fuel injection amount and an injection timing of the fuel injection device 66 for the fuel injection control, and to control the timing of the ignition by the ignition device 68 such as an igniter for the ignition timing control so as to provide the output control of the engine 12 such that the necessary engine output $P_E$ is generated. Therefore, the hybrid control means 346 functions as an engine drive control means controlling the drive of the engine 12.

For example, the hybrid control means 346 drives the throttle actuator 64 basically based on the accelerator opening degree Acc in accordance with a preliminarily stored relationship not depicted to provide the throttle control such that the throttle valve opening degree $\theta_{TH}$ is increased as the accelerator opening degree Acc increases.

The hybrid control means 346 can achieve the motor running (EV mode running) using, for example, the second electric motor M2 as a drive force source for running without using the engine 12 through the electric CVT function (differential action) of the differential portion 311 regardless of whether the engine 12 is stopped or in the idle state. For example, a drive force source switching diagram sectionalized into an engine running range and a motor running range as depicted in FIG. 6 of the first embodiment is determined in advance, and the switching between the engine running and the motor running is performed based on which of the engine running range and the motor running range a running state of the vehicle 8 (vehicle state) belongs to in the drive force source switching diagram. The drive force source switching diagram is stored in advance in the storage means 344 along with the shift diagram.

The hybrid control means 346 determines either the motor running range or the engine running range based on the vehicle state indicated by the actual vehicle speed V and the required output torque (required output torque) $T_{OUT}$ of the automatic transmission portion 320 from, for example, the drive force source switching diagram to perform the motor running if the vehicle state belongs to the motor running range and perform the engine running if the vehicle state belongs to the engine running range.

During the motor running, the hybrid control means 346 controls the first electric motor rotation speed $N_{M1}$ at a negative rotation speed to idle the first electric motor M1 in a no-load state, for example, and to maintain the engine rotation speed Ne at zero or substantially zero as needed through the electric CVT function (differential action) of the differential portion 311 so as to suppress the drag of the stopped engine 12 and improve the fuel efficiency.

The hybrid control means 346 can provide so-called torque assist for complementing the power of the engine 12 by supplying the electric energy from the first electric motor M1 and/or the electric energy from the electric storage device 37 through the electric path described above to the second electric motor M2 and by driving the second electric motor M2 to apply a torque to the drive wheels 17, even in the engine running range in which the engine running is performed by using the engine 12 as a drive force source for running. Therefore, the engine running of this embodiment includes the case of using the engine 12 as the drive force source for running and the case of using both the engine 12 and the second electric motor M2 as the drive force source for running. The motor running of this embodiment is the running while the second electric motor M2 is used as the drive force source for running with the engine 12 stopped.

The hybrid control means 346 includes an engine start/stop control means 348 that switches the operation state of the engine 12 between an operating state and a stopped state, i.e., that starts and stops the engine 12 so as to switch the engine running and the motor running. The engine start/stop control means 348 corresponds to the engine start/stop control means 118 of the first embodiment. The engine start/stop control means 348 starts or stops the engine 12 if the hybrid control means 346 determines to make the switch between the motor running and the engine running based on the vehicle state from the drive force source switching diagram, for example.

For example, if the accelerator pedal 90 is depressed and operated to increase the required drive torque $T_{OUT}$ and the hybrid control means 346 determines that the vehicle state changes from the motor running range to the engine running range and determines to make the switch from the motor running to the engine running, i.e., the hybrid control means 346 determines to start the engine, the engine start/stop control means 348 starts the engine 12. However, the engine is started with a method different from the engine starting method performed by the engine start/stop control means 118 of the first embodiment. If it is determined that the switch is made from the motor running to the engine running, the engine start/stop control means 348 energizes the first electric motor M1 to raise the first electric motor rotation speed $N_{M1}$, i.e., causes the first electric motor M1 to function as a starter by utilizing the differential action of the power distribution mechanism 316 to provide the engine rotation drive control of raising the engine rotation speed Ne to a predefined rotation speed Ne' enabling complete explosion, for example, a predefined autonomous rotation speed $N_{EIDL}$ or higher enabling autonomous rotation equal to or greater than the idle rotation speed and to provide the engine torque generation control of supplying (injecting) fuel with the fuel injection device 66 while the ignition device 68 ignites the fuel to generate the engine torque Te at the predefined rotation speed Ne' or higher, thereby starting engine 12 to make the switch from the motor running to the engine running. If the depressed accelerator pedal 90 is returned to reduce the required drive torque $T_{OUT}$ and the vehicle state changes from the engine running range to the motor running range, the engine start/stop control means 348 causes the fuel injection device 66 to stop the fuel supply, i.e., stops the engine 12 by a fuel cut to make the switch from the engine running to the motor running by the hybrid control means 346. When automatically stopping the engine 12 as in the case of the switch from the engine running to the motor running, the engine start/stop control means 348 provides the stop-time crank angle control in the same way as the engine start/stop control means 118 of the first embodiment; however, since the vehicle drive device 308 does not have the brake Bs and the torque converter 16 and is provided with the power distribution mechanism 316 as depicted in FIG. 16, the first electric motor M1 is controlled by utilizing the differential action of the power distribution mechanism 316, thereby providing the stop-time crank angle control.

The hybrid control means 346 can cause the first electric motor M1 to freely rotate, i.e., idle in the no-load state to put the differential portion 311 into the state unable to transmit a torque, i.e., the state equivalent to the state with the power transmission path interrupted in the differential portion 311, in which the output from the differential portion 311 is not generated. Therefore, the hybrid control means 346 can put the first electric motor M1 into the no-load state to put the differential portion 311 into the neutral state (neutral state) that electrically interrupts the power transmission path.

The hybrid control means 346 provides the regenerative control putting the engine 12 into the non-driving state to convert kinetic energy of the vehicle 306 transmitted from the drive wheels 17 into the electric energy with the differential portion 311 to improve the fuel efficiency (reduce a fuel consumption rate) during the inertia running (during coasting) when the acceleration is turned off and when the wheel brake is actuated by a brake pedal operation. Specifically, the hybrid control means 346 provides the regenerative control rotationally driving and causing the second electric motor M2 to operate as an electric generator by a reverse drive force transmitted from the drive wheels 17 toward the engine 12 so as to charge the electric storage device 37 via the inverter 36 with the electric energy, i.e., a current generated by the second electric motor. In other words, the hybrid control means 346 functions as a regenerative control means providing the regenerative control.

Since the electronic control device 340 of this embodiment includes the engine start/stop control means 348 corresponding to the engine start/stop control means 118 of the first embodiment and can make the switch between the engine running and the motor running, the control operation depicted in the flowchart of FIG. 13 may be performed in this embodiment. In this embodiment, all the steps making up the flowchart of FIG. 13 correspond to the engine start/stop control means 348.

Since the electronic control device 340 includes the engine automatic stop period determining means 124, the shift period determining means 126, the crank angle stability determining means 128, the engine start time determining means 130, and the engine rotation resistance control means 132 of the first embodiment, the control operation depicted in the flowchart of FIG. 15 may be performed in this embodiment. However, since the electronic control device 340 does not include the capacity-lowering control means 120 of the first embodiment, the control operation depicted in the flowchart of FIG. 14 is not performed in this embodiment.

Although the power transmission between the crankshaft 14 of the engine 12 and the transmitting member 318 is interrupted by causing the first electric motor M1 to idle in the no-load state in the vehicle drive device 308 of this embodiment, the power transmission may not completely be interrupted and the crankshaft 14 may be dragged by the rotation of the transmitting member 318 even if the first electric motor M1 is in the no-load state. Since the control operation of the flowchart of FIG. 15 is also performed in this embodiment, this embodiment has the same effects as the effects (A1) to (A10) described in the first embodiment.

Third Embodiment

This embodiment is basically the same as the first embodiment and, therefore, differences from the first embodiment will hereinafter be described.

Although the intake valve drive device 64 is mainly made up of the cam mechanism in the first embodiment, an intake valve drive device 464 of this embodiment is not mainly made up of the cam mechanism and includes an electromagnetic valve drive mechanism capable of applying an electromagnetic force to the intake valve 62 along the direction of the reciprocating movement of the intake valve 62. Therefore, the intake valve drive device 464 has a function as an intake valve opening/closing timing changing device changing the opening timing and the closing timing of the intake valve 62 independently of each other. The operating principle of an exhaust valve drive device 468 of this embodiment is the same as the intake valve drive device 464. Therefore, the exhaust valve drive device 468 has a function as an exhaust valve opening/closing timing changing device changing the opening timing and the closing timing of the exhaust valve 66 independently of each other.

Although the relationship between the engine rotation resistance and the closing timing of the intake valve 62 and the opening timing of the exhaust valve 66 is described with reference to FIG. 8 in the first embodiment, the engine rotation resistance also varies depending on the opening timing of the intake valve 62 and the closing timing of the exhaust valve 66 and, therefore, the relationship between the engine rotation resistance and the opening timing of the intake valve 62 and the closing timing of the exhaust valve 66 will be described with reference to FIG. 8.

In FIG. 8, when both the intake valve 62 and the exhaust valve 66 are continuously closed longer, the engine rotation resistance becomes larger. For example, from the viewpoint on the top dead center side of the FIG. 8, the engine rotation resistance becomes larger in accordance with the extension of an intake/exhaust valve closed period PD1 while both the intake valve 62 and the exhaust valve 66 are closed. Therefore, when the opening timing of the intake valve 62 is more shifted in the delay direction or when the closing timing of the exhaust valve 66 is more shifted in the advance direction, the intake/exhaust valve closed period PD1 is further extended and, as a result, the engine rotation resistance becomes larger. However, changing the top dead center side intake/exhaust timing, i.e., the opening timing of the intake valve 62 and the closing timing of the exhaust valve 66 has a smaller degree of effect on (degree of contribution to) the engine rotation resistance as compared to changing the bottom dead center side intake/exhaust timing, i.e., the closing timing of the intake valve 62 and the opening timing of the exhaust valve 66.

In this embodiment, to add the effect of the top dead center side intake/exhaust timing on the engine rotation resistance, the opening timing and the closing timing are changed independently of each other in each of the intake valve 62 and the exhaust valve 66 in the engine rotation resistance control.

Although a main portion of control function included in an electronic control device 440 of this embodiment is depicted in FIG. 9 as is the case with the electronic control device 40 of the first embodiment, since the opening timing and the closing timing are changed independently of each other in each of the intake valve 62 and the exhaust valve 66 in the engine rotation resistance control, the electronic control device 440 includes an engine rotation resistance control means 432 instead of the engine rotation resistance control means 132.

The engine rotation resistance control means 432 is different from the engine rotation resistance control means 132 of the first embodiment in that the engine rotation resistance control means 432 changes the opening timing and the closing timing of the intake valve 62 independently of each other and changes the opening timing and the closing timing of the exhaust valve 66 independently of each other in the engine rotation resistance control, and the other points are the same as the engine rotation resistance control means 132. Specifically, in the engine rotation resistance control, the engine rotation resistance control means 432 uses the intake valve drive device 464 and the exhaust valve drive device 468 to shift the opening timings of the intake valve 62 and the exhaust valve 66 in the delay direction as compared to the time of engine start and to shift the closing timings of the intake valve 62 and the exhaust valve 66 in the advance direction as compared to the time of engine start. In this way, the engine rotation resistance is increased as compared to the time of engine start.

In the engine rotation resistance control, for example, the engine rotation resistance control means 432 may maintain the intake valve 62 and the exhaust valve 66 in the closed state regardless of the crank angle $AG_{CR}$ to increase the engine rotation resistance, instead of shifting the opening timing and the closing timing of the intake valve 62 and the exhaust valve 66 as described above.

At the time of engine start, the engine rotation resistance control means 432 adjusts the opening timing and the closing timing of the intake valve 62 and the exhaust valve 66 within the available variation ranges thereof such that the engine rotation resistance is minimized before causing the engine start/stop control means 118 to start the engine 12 as is the case with the engine rotation resistance control means 132 of the first embodiment. However, in this embodiment, in this case, the adjustment positions of the opening timing and the closing timing of the intake valve 62 and the exhaust valve 66 have differences from the first embodiment. Specifically, at the time of engine start, the engine rotation resistance control means 432 uses the intake valve drive device 464 and the exhaust valve drive device 468 to set the opening timings of the intake valve 62 and the exhaust valve 66 at the most advanced position located on the most advanced side within the available ranges thereof and to set the closing timings of the intake valve 62 and the exhaust valve 66 at the most delayed position located on the most delayed side within the available ranges thereof. Also after the post-shift extension time TIME01 (see FIG. 10) has elapsed from completion of the shift of the automatic transmission 18, the opening timings of the intake valve 62 and the exhaust valve 66 are set to the most advanced position and the closing timings of the intake valve 62 and the exhaust valve 66 are set to the most delayed position.

Figure 20:
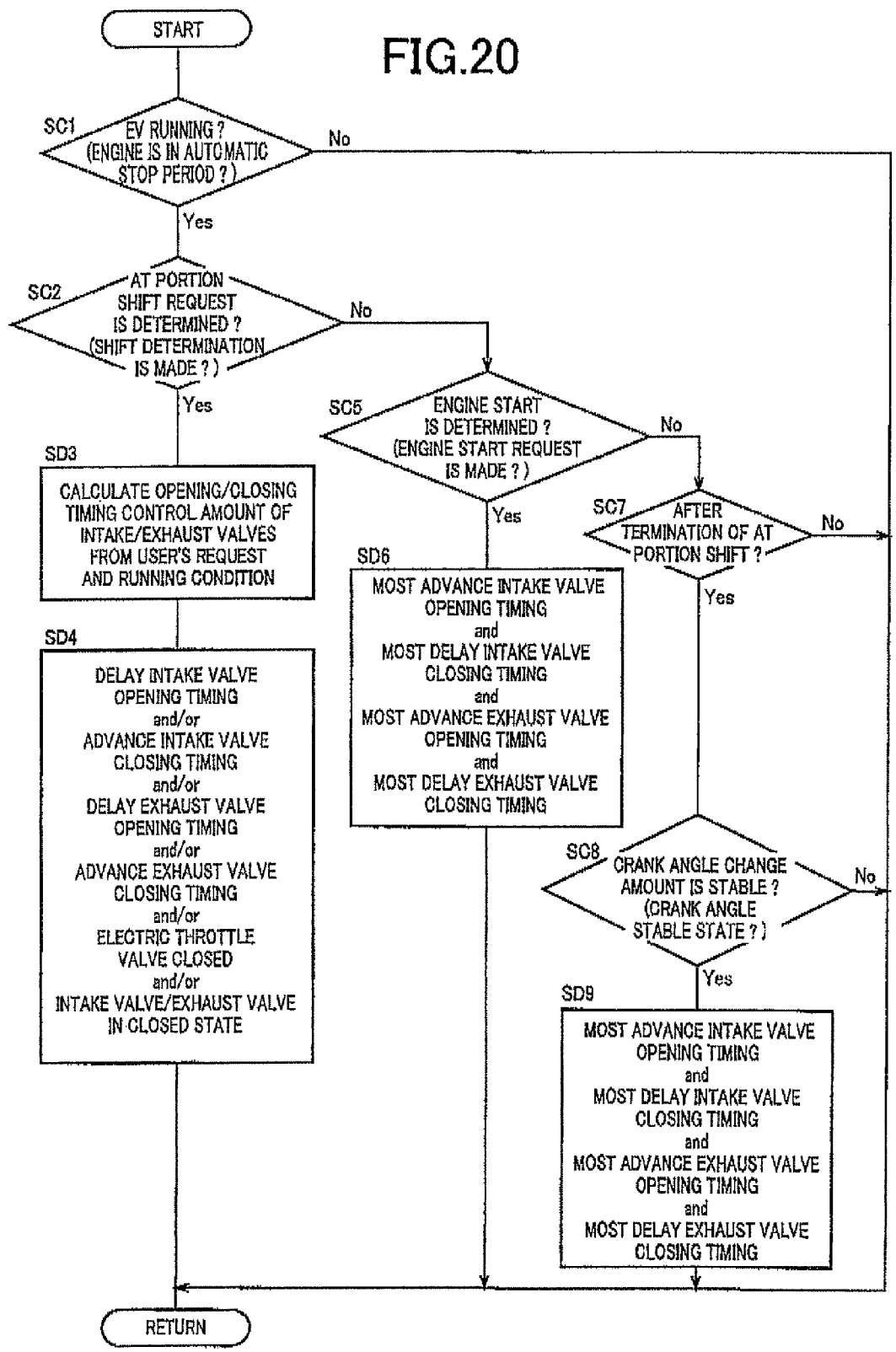
FIG. 20 is a flowchart for explaining a main portion of the control operation of the electronic control device of FIG. 9 in a third embodiment, corresponding to FIG. 15.

FIG. 20 is a flowchart for explaining a main portion of the control operation of the electronic control device 440 of this embodiment, corresponding to FIG. 15 of the first embodiment, and is repeatedly executed with an extremely short cycle time, for example, on the order of few msec to a few tens of msec. The control operation depicted in FIG. 20 is performed solely or concurrently with another control operation.

Although FIG. 20 is basically the same as the flowchart of FIG. 15, FIG. 20 is different in that SC3, SC4, SC6, and SC9 of FIG. 15 are replaced with SD3, SD4, SD6, and SD9, respectively.

At SD3 of FIG. 20, as is the case with SC3 of the FIG. 15, a control amount is calculated and determined in relation to the opening/closing timings of the intake valve 62 and the exhaust valve 66 in the engine rotation resistance control based on at least one of the driver's request and the vehicle state such as a running condition. The calculation method is the same as the case of SC3. However, the differences from SC3 of FIG. 15 are that each of the control amounts related to the opening timing and the closing timing of the intake valve 62 is separately calculated and that each of the control amounts related to the opening timing and the closing timing of the exhaust valve 66 is separately calculated. The other points are the same as SC3.

At SD4, the engine rotation resistance control is provided. However, the engine rotation resistance control is different from SC4 of FIG. 15 in that the intake valve drive device 464 and the exhaust valve drive device 468 shift the opening timings of the intake valve 62 and the exhaust valve 66 in the delay direction as compared to the time of engine start and shift the closing timings of the intake valve 62 and the exhaust valve 66 in the advance direction as compared to the time of engine start. The other points are the same as SC4.

Although the opening timings and the closing timings of the intake valve 62 and the exhaust valve 66 are shifted relative to the time of engine start in the engine rotation resistance control at SD4, SD4 may include the execution of at least one of shifting the opening timing of the intake valve 62 in the delay direction as compared to the time of engine start, shifting the closing timing of the intake valve 62 in the advance direction as compared to the time of engine start, shifting the opening timing of the exhaust valve 66 in the delay direction as compared to the time of engine start, shifting the closing timing of the exhaust valve 66 in the advance direction as compared to the time of engine start, actuating the electric throttle valve 70 to be further closed as compared to the time of engine start, and maintaining the intake valve 62 and the exhaust valve 66 in the closed state regardless of the crank angle $AG_{CR}$.

At SD6, the opening timings and the closing timings of the intake valve 62 and the exhaust valve 66 are adjusted within the adjustable ranges thereof such that the engine rotation resistance is minimized. However, a difference from SC6 of FIG. 15 is that the intake valve drive device 464 and the exhaust valve drive device 468 set the opening timings of the intake valve 62 and the exhaust valve 66 at the most advanced position and set the closing timings of the intake valve 62 and the exhaust valve 66 at the most delayed position. The other points are the same as SC6.

The difference of SD9 from SC9 is the same as the difference of SD6 from SC6. SD3, SD4, SD6, and SD9 correspond to the engine rotation resistance control means 432.

This embodiment has the same effects as the effects (A1) and (A3) to (A10) described in the first embodiment. According to this embodiment, the engine rotation resistance control means 432 uses the intake valve drive device 464 and the exhaust valve drive device 468 to shift the opening timings of the intake valve 62 and the exhaust valve 66 in the delay direction as compared to the time of engine start and to shift the closing timings of the intake valve 62 and the exhaust valve 66 in the advance direction as compared to the time of engine start in the engine rotation resistance control; however, the engine rotation resistance may be increased by at least one of shifting the opening timing of one or both of the intake valve 62 and the exhaust valve 66 in the delay direction as compared to the time of engine start, shifting the closing timing of one or both of the intake valve 62 and the exhaust valve 66 in the advance direction as compared to the time of engine start, and maintaining the intake valve 62 and the exhaust valve 66 in the closed state regardless of the crank angle $AG_{CR}$ of the engine 12. In this way, a larger level of the engine rotation resistance can easily be acquired in the engine rotation resistance control as compared to the case of advancing or delaying the opening timing and the closing timing of the intake valve 62 or the exhaust valve 66 together as in the first embodiment.

Although the exemplary embodiments of the present invention have been described in detail with reference to the drawings, the present invention is not limited to the embodiments and may be implemented in other forms.

For example, although the engine 12 is a gasoline engine in the first to third embodiments, the engine 12 may be a diesel engine using light oil etc., as fuel.

Although the vehicle drive device 10 is provided with the brake Bs in the first and third embodiments, the vehicle drive device 10 may be provided with a unidirectional clutch disposed between and coupling the stator impeller 16s and the transmission case 24 instead of the brake Bs. In this case, the unidirectional clutch used in place of the brake Bs couples the stator impeller 16s rotatably in the positive rotation direction of the crankshaft 14 (the rotation direction of the crankshaft 14 during the operation of the engine 12) and non-rotatably in the negative rotation direction relative to the transmission case 24. In the torque converter 16, the torque amplification effect can be acquired by non-rotatably fixing the stator impeller 16s via the unidirectional clutch in the converter range and the reduction in efficiency is suppressed by putting the stator impeller 16s into the free rotation state in the coupling range. If the brake Bs is not included, the control operation depicted in the flowchart of FIG. 14 is unnecessary.

Although the engine rotation speed Ne of the engine 12 is raised by the electric motor 21 for running at the time of engine start in the first and third embodiments, if a starter motor is disposed separately from the electric motor 21 for running, the engine rotation speed Ne may be raised by the starter motor without using the electric motor 21 for running at the time of engine start.

Although the electric motor 21 for running and the brake Bs are controlled in the stop-time crank angle control to stop the engine 12 with the engine crank angle $AG_{CR}$ controlled such that the engine crank angle $AG_{CR}$ at the time of automatic stop of the engine 12 falls within the crank angle stop range $AG_{ST}$ in the first and third embodiments, the engine crank angle $AG_{CR}$ at the time of engine stop may be controlled by controlling an electric power generation of an alternator (electric generator) driven by the engine 12 instead of controlling the electric motor 21 for running and the brake Bs. Therefore, the stop-time crank angle control can be provided in normal engine vehicles without the electric motor 21 for running. In the stop-time crank angle control, when the engine 12 is stopped, if the engine crank angle $AG_{CR}$ at the time of stop (immediately after the stop) is out of the crank angle stop range $AG_{ST}$, the electric motor 21 for running and the brake Bs may be controlled to rotate the crankshaft 14 such that the engine crank angle $AG_{CR}$ falls within the crank angle stop range $AG_{ST}$.

Although the time chart of FIG. 10 described in the first embodiment is an example of a downshift of the automatic transmission 18, the engine rotation resistance control may be provided during an upshift of the automatic transmission 18.

Although no electric motor is disposed between the crankshaft 14 of the engine 12 and the pump impeller 16p in the vehicle drive device 10 of the first and third embodiments, a motor generator (second electric motor) similar to the electric motor 21 for running may be coupled between the crankshaft 14 and the pump impeller 16p.

Although the brake Bs is made up of a hydraulic friction engagement device in the first and third embodiments, the brake Bs may be made up of an electromagnetic clutch, for example.

Although the automatic transmission 18 is shifted to Rev1 or Rev2 depicted in FIG. 5 and the transmission input shaft 20 is rotated in the positive rotation direction when the vehicle 8 is caused to run backward in the first and third embodiments, the vehicle 8 may be caused to run backward by shifting the automatic transmission 18 to any one of 1st to 8th depicted in FIG. 5 and driving the electric motor 21 for running in the negative rotation direction.

Although the vehicle drive device 10 includes the torque converter 16 in the first and third embodiments, this is not a limitation and a fluid coupling may be included.

In the first and third embodiments, the electric motor 21 for running may necessarily be included. For example, the vehicle may be a normal engine vehicle performing idling reduction.

Although the automatic transmission 18 is a stepped transmission in the first and third embodiments, the automatic transmission 18 may be a continuously variable transmission (CVT) capable of continuously varying a gear ratio. The same applies to the automatic transmission portion 320 of the second embodiment.

Although the vehicle drive device 10 includes the automatic transmission 18 subjected to the automatic shift control in the first and third embodiments, a configuration without the automatic transmission 18 is also conceivable. The same applies to the vehicle drive device 308 of the second embodiment.

In the first to third embodiments, the vehicle drive devices 10 and 308 are not limited to those used in FR (front-engine rear-drive) type vehicles and may be those used in vehicles of other drive types.

Although the engine rotation resistance control means 132 and 432 provide the engine rotation resistance control while the engine 12 is in the automatic stop period and the automatic transmission 18 is in the shift period in the first to third embodiments, the engine rotation resistance control may be provided without limiting to the shift period of the automatic transmission 18 and the engine rotation resistance control may be terminated at the time of engine start to provide the engine-start-time intake/exhaust timing control.

Although the opening/closing timings of both the intake valve 62 and the exhaust valve 66 are changed in the engine rotation resistance control in the first and second embodiments, the opening/closing timings of only one of the valves may be changed.

Although in the time chart of FIG. 10 described in the first embodiment, the engine rotation resistance is changed in the engine rotation resistance control in the increasing direction from time t2 to time t3 of FIG. 10, the engine rotation resistance may be changed in the increasing direction at different timing, for example, from time t3 when the inertia phase starts.

Although in the time chart of FIG. 10 described in the first embodiment, the engine rotation resistance control means 132 terminates the engine rotation resistance control after the predefined post-shift extension time TIME01 has elapsed from completion of the shift of the automatic transmission 18

(the automatic transmission portion 320) (time t4), it is conceivable that the engine rotation resistance control is immediately terminated at the time of completion of the shift.

Although at the time of engine start, the opening/closing timings of the intake valve 62 are set at the most delayed position and the opening/closing timings of the exhaust valve 66 are set at the most advanced position in the first and second embodiments, these are not limitations of the opening/closing timings of the intake valve 62 and the exhaust valve 66 at the time of engine start. The same applies to the third embodiment.

In the second embodiment, at the time of engine start when the motor running is switched to the engine running, the engine start/stop control means 348 may provide start-time vibration suppression control of varying the output torque of the first electric motor M1 so as to cancel vibrations such as resonance of the engine 12. As a result, the effect of the start-time vibration suppression control is more easily produced by providing the stop-time crank angle control.

In the first and third embodiments, the capacity-lowering control means 120 is not limited to the embodiments and may be configured such that the reverse drive capacity coefficient C of the torque converter 16 is continuously varied by controlling the engagement torque of the brake Bs depending on the engine rotation speed Ne, for example.

Although the engine rotation resistance control means 132 determines the intake timing advance width $A_{INH}$ and the exhaust timing delay width $A_{EXH}$ based on at least one of the driver's request and the vehicle state in the first embodiment, the intake timing advance width $A_{INH}$ and the exhaust timing delay width $A_{EXH}$ may be constant values regardless of the driver's request and the vehicle state.

Although both the intake valve drive device 64 and the exhaust valve drive device 68 have a valve opening/closing timing changing function of changing the opening/closing timings of a valve in the first embodiment, only one of the intake valve drive device 64 and the exhaust valve drive device 68 may have the valve opening/closing timing changing function. The same applies to the third embodiment and only one of the intake valve drive device 464 and the exhaust valve drive device 468 may have the valve opening/closing timing changing function.

Although both the intake valve drive device 64 and the exhaust valve drive device 68 are mainly made up of the cam mechanism in the first embodiment, only one of the intake valve drive device 64 and the exhaust valve drive device 68 may mainly be made up of the cam mechanism and the other may be configured to include the electromagnetic valve drive mechanism.

A plurality of the embodiments described above may be implemented in a mutually combined manner by setting priorities, for example.

The described embodiments are merely exemplary embodiments and, although not exemplarily illustrated one by one, the present invention may be implemented in variously modified and improved forms based on the knowledge of those skilled in the art without departing from the spirit thereof.

NOMENCLATURE OF ELEMENTS 8, 306: vehicle
12: engine
14: crankshaft
17: drive wheels
18: automatic transmission
40, 340, 440: electronic control device (engine start control device)
52: combustion chamber
62: intake valve
64, 464: intake valve drive device (intake valve opening/closing timing changing device)
66: exhaust valve
68, 468: exhaust valve drive device (exhaust valve opening/closing timing changing device)
70: electric throttle valve
320: automatic transmission portion (automatic transmission)

The invention claimed is:

1. A vehicle engine start control device controlling a crank angle such that the crank angle falls within a predetermined crank angle stop range when an engine is automatically stopped, the vehicle engine start control device starting the automatically stopped engine if a predetermined engine start condition is satisfied,
   the vehicle including an automatic transmission making up a portion of a power transmission path between the engine and drive wheels, and
   the vehicle engine start control device providing engine rotation resistance control such that rotation resistance of the engine generated due to a change in air pressure in a combustion chamber of the engine is made larger during an automatic stop period of the engine when the engine is automatically stopped and during a change in gear ratio in a shift of the automatic transmission as compared to the time of engine start.

2. The vehicle engine start control device of claim 1, wherein
   the engine includes at least one of an intake valve opening/closing timing changing device advancing or delaying both opening timing and closing timing of an intake valve and an exhaust valve opening/closing timing changing device advancing or delaying both opening timing and closing timing of an exhaust valve, and wherein
   in the engine rotation resistance control, the rotation resistance of the engine is made larger by at least one of shifting the opening timing and the closing timing of the intake valve in advance direction as compared to the time of the engine start and shifting the opening timing and the closing timing of the exhaust valve in delay direction as compared to the time of the engine start.

3. The vehicle engine start control device of claim 1, wherein
   the engine includes at least one of an intake valve opening/closing timing changing device changing opening timing and closing timing of an intake valve independently of each other and an exhaust valve opening/closing timing changing device changing opening timing and closing timing of an exhaust valve independently of each other, and wherein
   in the engine rotation resistance control, the rotation resistance of the engine is made larger by at least one of shifting the opening timing of one or both of the intake valve and the exhaust valve in delay direction as compared to the time of the engine start, shifting the closing timing of one or both of the intake valve and the exhaust valve in advance direction as compared to the time of the engine start, and maintaining the intake valve and the exhaust valve in a closed state regardless of the crank angle of the engine.

4. The vehicle engine start control device of claim 1, wherein
in the engine rotation resistance control, the rotation resistance of the engine is made larger by further closing an electric throttle valve adjusting an intake air amount into the engine as compared to the time of the engine start.

5. The vehicle engine start control device of claim 2, wherein
in the engine rotation resistance control, the rotation resistance of the engine is made larger by further closing an electric throttle valve adjusting an intake air amount into the engine as compared to the time of the engine start.

6. The vehicle engine start control device of claim 3, wherein
in the engine rotation resistance control, the rotation resistance of the engine is made larger by further closing an electric throttle valve adjusting an intake air amount into the engine as compared to the time of the engine start.

7. The vehicle engine start control device of claim 1, wherein
in the engine rotation resistance control, the rotation resistance of the engine during the stop period of the engine is set based on at least one of a request from a driver and a vehicle state.

8. The vehicle engine start control device of claim 2, wherein
in the engine rotation resistance control, the rotation resistance of the engine during the stop period of the engine is set based on at least one of a request from a driver and a vehicle state.

9. The vehicle engine start control device of claim 3, wherein
in the engine rotation resistance control, the rotation resistance of the engine during the stop period of the engine is set based on at least one of a request from a driver and a vehicle state.

10. The vehicle engine start control device of claim 4, wherein
in the engine rotation resistance control, the rotation resistance of the engine during the stop period of the engine is set based on at least one of a request from a driver and a vehicle state.

11. The vehicle engine start control device of claim 5, wherein
in the engine rotation resistance control, the rotation resistance of the engine during the stop period of the engine is set based on at least one of a request from a driver and a vehicle state.

12. The vehicle engine start control device of claim 6, wherein
in the engine rotation resistance control, the rotation resistance of the engine during the stop period of the engine is set based on at least one of a request from a driver and a vehicle state.

13. The vehicle engine start control device of claim 1, wherein
in the engine rotation resistance control, a control to vary the rotation resistance of the engine to increase as compared to the time of engine start is completed before a change in gear ratio is started in a shift of the automatic transmission.

14. The vehicle engine start control device of claim 2, wherein
in the engine rotation resistance control, a control to vary the rotation resistance of the engine to increase as compared to the time of engine start is completed before a change in gear ratio is started in a shift of the automatic transmission.

15. The vehicle engine start control device of claim 3, wherein
in the engine rotation resistance control, a control to vary the rotation resistance of the engine to increase as compared to the time of engine start is completed before a change in gear ratio is started in a shift of the automatic transmission.

16. The vehicle engine start control device of claim 4, wherein
in the engine rotation resistance control, a control to vary the rotation resistance of the engine to increase as compared to the time of engine start is completed before a change in gear ratio is started in a shift of the automatic transmission.

17. The vehicle engine start control device of claim 7, wherein
in the engine rotation resistance control, a control to vary the rotation resistance of the engine to increase as compared to the time of engine start is completed before a change in gear ratio is started in a shift of the automatic transmission.

18. The vehicle engine start control device of claim 1, wherein
if it is determined that a crank angle of the engine enters a predetermined stable state after completion of a shift of the automatic transmission, the engine rotation resistance control is terminated.

19. The vehicle engine start control device of claim 1, wherein
if an engine start request for starting the engine is made while the rotation resistance of the engine is made larger in the engine rotation resistance control as compared to the time of the engine start, the rotation resistance of the engine is returned to a level at the time of the engine start before the engine is started.

* * * * *